United States Patent
Maaz et al.

(10) Patent No.: US 12,373,672 B2
(45) Date of Patent: Jul. 29, 2025

(54) SYSTEM AND METHOD FOR EFFICIENTLY AMALGAMATED CNN-TRANSFORMER ARCHITECTURE FOR MOBILE VISION APPLICATIONS

(71) Applicant: Mohamed bin Zayed University of Artificial Intelligence, Abu Dhabi (AE)

(72) Inventors: Muhammad Maaz, Abu Dhabi (AE); Abdelrahman Shaker, Abu Dhabi (AE); Hisham Cholakkal, Abu Dhabi (AE); Salman Khan, Abu Dhabi (AE); Syed Waqas Zamir, Abu Dhabi (AE); Rao Muhammad Anwer, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 483 days.

(21) Appl. No.: 18/078,657

(22) Filed: Dec. 9, 2022

(65) Prior Publication Data

US 2024/0193404 A1    Jun. 13, 2024

(51) Int. Cl.
G06N 3/0464    (2023.01)
G05D 1/00    (2024.01)
(Continued)

(52) U.S. Cl.
CPC ........ G06N 3/0464 (2023.01); G05D 1/0221 (2013.01); G06T 1/20 (2013.01);
(Continued)

(58) Field of Classification Search
CPC ...... G06N 3/0464; G06N 3/045; G06N 3/084; G05D 1/0221; G06T 1/20; G06V 10/25;
(Continued)

(56) References Cited

U.S. PATENT DOCUMENTS

2022/0012848 A1*    1/2022    Ranftl ................. G06T 5/00
2022/0207321 A1*    6/2022    Gulati ................. G06N 3/04

FOREIGN PATENT DOCUMENTS

CN    114493991 A    5/2022
WO    WO-2023102223 A1 *    6/2023

OTHER PUBLICATIONS

Xin Xia, et al., "TRT-ViT: TensorRT-oriented Vision Transformer", Computer Vision and Pattern Recognition (cs.CV), arXiv:2205.09579v2, May 23, 2022, pp. 1-12.

* cited by examiner

Primary Examiner — Nay A Maung
Assistant Examiner — Dustin Bilodeau
(74) Attorney, Agent, or Firm — Oblon, McClelland, Maier & Neustadt, L.L.P.

(57) ABSTRACT

An edge computing system, computer readable storage medium and method for object detection, including processing circuitry. The processing circuitry is configured with a hybrid CNN and vision transformer backbone network in an object detection deep learning network. The backbone network receives an image, and includes a first convolutional encoder to extract local features from feature maps of the image, a second stage having consecutive second convolutional encoders, a positional encoding layer, split depth-wise transpose attention (SDTA) encoders, consecutive convolutional encoders, a third stage and a fourth stage SDTA encoder. Each of the SDTA encoders perform multi-headed self-attention by applying a dot product operation across channel dimensions in order to compute cross-covariance across channels to generate attention feature maps. The object detection neural network includes a convolutional
(Continued)

network that produces a fixed-size collection of bounding boxes and scores for a presence of object class instances in those boxes.

20 Claims, 28 Drawing Sheets

(51) Int. Cl.
    *G06T 1/20*           (2006.01)
    *G06V 10/25*         (2022.01)
    *G06V 10/82*         (2022.01)

(52) U.S. Cl.
    CPC .............. *G06V 10/25* (2022.01); *G06V 10/82* (2022.01); *G06V 2201/07* (2022.01)

(58) Field of Classification Search
    CPC .. G06V 10/82; G06V 2201/07; G06V 10/454; G06V 10/764
    See application file for complete search history.

SYSTEM AND METHOD FOR EFFICIENTLY AMALGAMATED CNN-TRANSFORMER ARCHITECTURE FOR MOBILE VISION APPLICATIONS

STATEMENT REGARDING PRIOR DISCLOSURE BY THE INVENTORS

Aspects of this technology are described in Maaz, Muhammad, Abdelrahman M. Shaker, Hisham Cholakkal, Salman Khan, Syed Waqas Zamir, Rao Muhammad Anwer and Fahad Shahbaz Khan. "EdgeNeXt: Efficiently Amalgamated CNN-Transformer Architecture for Mobile Vision Applications." ArXiv abs/2206.10589 (2022), which is incorporated herein by reference in its entirety.

BACKGROUND

Technical Field

The present disclosure is directed to edge computing systems, in particular autonomous mobile robots, which are equipped with a compute efficient hybrid deep learning network architecture for object detection and semantic segmentation. The hybrid network architecture includes a convolution encoder with adaptive kernel sizes in combination with a split depth-wise transpose attention encoder that increases the receptive field and encodes multi-scale features, allowing for minimum latency inference in the edge computing systems.

Description of Related Art

Edge computing involves computing outside the cloud happening at the edge of the network, and more specifically in applications where real-time processing of data is required. From one perspective, cloud computing operates on big data while edge computing operates on instant data that is real-time data generated by sensors or users. One goal of edge computing is to move the computation away from data centers towards the edge of the network, exploiting smart objects, mobile phones, mobile robots, and network gateways to perform tasks and provide services locally with reduced use of cloud services. Edge application services reduce the volumes of data that must be moved to the cloud, the consequent traffic, and the distance that data must travel. That reduction can reduce latency and reduce transmission costs. However, distributing the logic to edge network nodes introduces unique issues and challenges.

Mobile robots are robots that can travel from a start location to a destination location safely. Wheeled mobile robots use wheels for their locomotion. Land robots can navigate on dry land and in buildings. An autonomous mobile robot is a robot which is capable of navigating an uncontrolled environment without the need for physical or electro-mechanical guidance devices. Typically, as level of autonomous control increases, a greater amount of the required computation is performed in a server or cloud service.

At a basic level of autonomous control, mobile robots can rely on guidance devices that allow them to travel a pre-defined navigation route in relatively controlled space. In one example, a manually teleoperated robot is under control of a user with a control device. The control device may be plugged directly into the robot, or may be wireless. A manually teleoperated robot is typically used to keep the user out of a dangerous environment.

In a level above a basic level of autonomous control, a line following mobile robot follows a path, typically using a visual line or an electrical wire. If a line following mobile robot encounters something that is blocking the path, the robot just stops and waits. Another level of autonomous control is where a robot navigates by sensing walls.

A high level of autonomous control is self-guided robot that knows some information about its location and how to reach waypoints along its path. The self-guided robot may use one or more means for calculating location using sensors. The self-guided robot can operate autonomously unless a hazard is encountered, such as crossing a road. In this case, the robot may cease motion and request an input from an operator. The operator may take over control of the robot until the hazardous condition is resolved. Once the setting is no longer hazardous, the self-guided robot may switch back to an autonomous mode of operation.

A self-guided robot may further be configured with an enhanced degree of autonomous operation, and may include a capability of learning to handle problems. The enhanced self-guided robot may be equipped with multiple sensors, such as several cameras and object sensors, such as ultrasonic sensors, to aid in navigating its surroundings.

Such enhanced self-guided robots are typically resource constrained by power, space, weight, computing speed and memory capacity, but require accurate and low latency for compute operations, such as recognizing a hazard or an unexpected obstacle while navigating the environment. However, to the extent possible an autonomous self-guided mobile robot can be equipped with a more sophisticated set of sensors and may rely on machine learning techniques for tasks including object detection and semantic segmentation. However, machine learning functions for object detection and semantic segmentation are typically implemented using high-performance computing resources, and in many cases training of a machine learning model is performed in an AI workstation or cloud service. This is because computer vision tasks are best performed with deep learning neural networks, in particular current deep learning arrangements in the form of convolutional neural networks and vision transformers.

Convolutional neural networks (CNNs) and the recently introduced vision transformers (ViTs) have significantly advanced the state-of-the-art (SOTA) in several mainstream computer vision tasks, including object recognition, detection and segmentation. See Salman Khan, Muzammal Naseer, Munawar Hayat, Syed Waqas Zamir, Fahad Shahbaz Khan, and Mubarak Shah. Transformers in vision: A survey. *ACM Computing Surveys (CSUR)*, 2021; and Jürgen Schmidhuber. Deep learning in neural networks: An overview. *Neural networks*, 61:85-117, 2015, each incorporated herein by reference in their entirety. The general trend is to make the network architectures deeper and more sophisticated in the pursuit of ever-increasing accuracy. While striving for higher accuracy, most existing CNN and ViT-based architectures ignore the aspect of computational efficiency (i.e., model size and speed) which is crucial to operating on resource-constrained devices such as mobile platforms. In many real-world applications e.g., robotics and self-driving cars, the recognition process is desired to be both accurate and have low latency on resource-constrained mobile platforms.

In recent years, designing lightweight hardware-efficient convolutional neural networks for mobile vision tasks has been well studied in literature. The current methods focus on designing efficient versions of convolutions for low-powered edge systems. See Andrew G. Howard, Menglong Zhu, Bo Chen, Dmitry Kalenichenko, Weijun Wang, Tobias Weyand, Marco Andreetto, and Hartwig Adam. Mobilenets: Efficient convolutional neural networks for mobile vision applications. CoRR, abs/1704.04861, 2017; and Iandola et al., each incorporated herein by reference in their entirety. Among these methods, MobileNet is the most widely used architecture which employs depth-wise separable convolutions. See François Chollet. Xception: Deep learning with depthwise separable convolutions. *In Proceedings of the IEEE/CVF Conference on Computer Vision and Pattern Recognition,* 2017, each incorporated herein by reference in their entirety. On the other hand, ShuffleNet uses channel shuffling and low-cost group convolutions. MobileNetV2 introduces inverted residual block with linear bottleneck, achieving promising performance on various vision tasks. See Xiangyu Zhang, Xinyu Zhou, Mengxiao Lin, and Jian Sun. Shufflenet: An extremely efficient convolutional neural network for mobile devices. In *Proceedings of the IEEE/CVF Conference on Computer Vision and Pattern Recognition,* 2018; and Sandler et al., each incorporated herein by reference in their entirety. ESPNetv2 utilizes depth-wise dilated convolutions to increase the receptive field of the network without increasing the network complexity. See Sachin Mehta, Mohammad Rastegari, Linda Shapiro, and Hannaneh Hajishirzi. Espnetv2: A light-weight, power efficient, and general purpose convolutional neural network. In *Proceedings of the IEEE/CVF Conference on Computer Vision and Pattern Recognition,* 2019, incorporated herein by reference in its entirety. The hardware-aware neural architecture search (NAS) has also been explored to find a better trade-off between speed and accuracy on mobile devices. Although these CCNs are faster to train and infer on mobile devices, they lack global interaction between pixels which limits their accuracy.

Also recently, Desovitskiy et al. introduces a vision transformer architecture based on the self-attention mechanism for vision tasks. See Desovitskiy et al. and Ashish Vaswani, Noam Shazeer, Niki Parmar, Jakob Uszkoreit, Llion Jones, Aidan N Gomez, Łukasz Kaiser, and Illia Polosukhin. Attention is all you need. In *Advances in Neural Information Processing Systems,* 2017, each incorporated herein by reference in their entirety. Their proposed architecture utilizes large-scale pre-training data (e.g., JFT-300M), extensive data augmentations, and a longer training schedule to achieve competitive performance. Later, DeiT proposes to integrate distillation token in this architecture and only employ training on ImageNet-1K dataset. See Hugo Touvron, Matthieu Cord, Matthijs Douze, Francisco Massa, Alexandre Sablayrolles, and Hervé Jégou. Training data-efficient image transformers & distillation through attention. In *International Conference on Machine Learning,* 2021; and Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. ImageNet Large Scale Visual Recognition Challenge. *International Journal of Computer Vision,* 115(3):211-252, 2015, each incorporated herein by reference in their entirety. Since then, several variants of ViTs and hybrid architectures are proposed in the literature, adding image-specific inductive bias to ViTs for obtaining improved performance on different vision tasks. See Stéphane d'Ascoli, Hugo Touvron, Matthew L Leavitt, Ari S Morcos, Giulio Biroli, and Levent Sagun. Convit: Improving vision transformers with soft convolutional inductive biases. In *International Conference on Machine Learning,* 2021: Haoqi Fan, Bo Xiong, Kartikeya Mangalam, Yanghao Li, Zhicheng Yan, Jitendra Malik, and Christoph Feichtenhofer. Multiscale vision transformers. In *Proceedings of the IEEE/CVF International Conference on Computer Vision,* 2021; Aravind Srinivas, Tsung-Yi Lin, Niki Parmar, Jonathon Shlens, Pieter Abbeel, and Ashish Vaswani. Bottleneck transformers for visual recognition. In *Proceedings of the IEEE/CVF Conference on Computer Vision and Pattern Recognition,* 2021: Tete Xiao, Piotr Dollar, Mannat Singh, Eric Mintun, Trevor Darrell, and Ross Girshick. Early convolutions help transformers see better. In *Advances in Neural Information Processing Systems,* 2021; and Jingkai Zhou, Pichao Wang, Fan Wang, Qiong Liu, Hao Li, and Rong Jin. Elsa: Enhanced local self-attention for vision transformer. arXiv preprint arXiv: 2112.12786, 2021, each incorporated herein by reference in their entirety.

ViT models achieve competitive results for several visual recognition tasks. However, it is difficult to deploy these models on resource-constrained edge systems because of the high computational cost of the multi-headed self-attention (MHA). There has been recent work on designing light-weight hybrid networks for mobile vision tasks that combine the advantages of CNNs and transformers. MobileFormer employs parallel branches of MobileNetV2 and ViTs with a bridge connecting both branches for local-global interaction. See Yinpeng Chen, Xiyang Dai, Dongdong Chen, Mengchen Liu, Xiaoyi Dong, Lu Yuan, and Zicheng Liu. Mobileformer: Bridging mobilenet and transformer. In *Proceedings of the IEEE/CVF Conference on Computer Vision and Pattern Recognition,* 2022; Sandler et al; and Dosovitskiy et al., each incorporated herein by reference in their entirety. Mehta et al. consider transformers as convolution and propose a MobileViT block for local-global image context fusion. Their approach achieves superior performance on image classification surpassing previous light-weight CNNs and ViTs using a similar parameter budget.

Although MobileViT mainly focuses on optimizing parameters and latency, MHA is still the main efficiency bottleneck in this model, especially for the number of MAdds and the inference time on edge systems. In particular, the complexity of MHA in MobileViT is quadratic relative to increases in the input size. Handling larger resolution input images is a major efficiency bottleneck given the existing nine attention blocks in MobileViT-S model.

Thus, there is a need for an improved computer vision model that can be implemented in mobile devices, in particular edge computing systems, that is efficient in terms of both parameters and MAdds, while maintaining or improving accuracy on mobile vision tasks. One object of the present disclosure is to provide a light-weight architecture that amalgamates a CNN with a vision transformer. The vision transformer provides a solution that includes an SDTA block that combines depth-wise convolutions with adaptive kernel sizes along with transpose attention in an efficient manner, obtaining an optimal accuracy-speed trade-off. Another object is to provide a light-weight architecture that is especially applicable to resource limited self-guided mobile devices including robotics and self-driving cars.

SUMMARY

An aspect of the present invention is an edge computing system for object detection, that can include processing circuitry including at least one multi-code graphics processing unit (GPU) having GPU memory, and a multi-core central processing unit (CPU) connected to random access memory (RAM); and at least one camera. The processing circuitry is configured with a hybrid convolutional neural network (CNN) and vision transformer backbone network in an object detection neural network, the backbone network comprising: an input for inputting an image from the at least one camera: a first stage having a first convolutional encoder to extract local features from feature maps of the input image: a second stage having a plurality of consecutive second convolutional encoders, a positional encoding layer, a second-stage split depth-wise transpose attention (SDTA) encoder; a third stage and a fourth stage, each having a plurality of consecutive third convolutional encoders, a third stage and a fourth stage split depth-wise transpose attention (SDTA) encoder, in which each of the second stage, third stage, fourth stage SDTA encoders perform multi-headed self-attention by applying a dot product operation across channel dimensions in order to compute cross-covariance across channels to generate attention feature maps, wherein the object detection neural network comprises: a feed-forward convolutional network that produces a fixed-size collection of bounding boxes and scores for a presence of object class instances in those boxes, followed by a non-maximum suppression layer to produce final object detections.

A further aspect of the invention is a non-transitory computer readable storage medium storing computer program instructions, which when executed in an edge computing system, performs a method of object detection, wherein the edge computing system comprises processing circuitry including at least one multi-code graphics processing unit (GPU) having GPU memory, and a multi-core central processing unit (CPU) connected to random access memory (RAM). The processing circuitry is configured with a hybrid convolutional neural network (CNN) and vision transformer backbone network in an object detection neural network. The method can include inputting an image: in a first stage having a convolutional encoder, extracting local features from the input image: in following stages each having a split depth-wise transpose attention (SDTA) encoder, performing multi-headed self-attention by applying a dot product operation across channel dimensions in order to compute cross-covariance across channels to generate attention feature maps: producing, in the object detection neural network, a fixed-size collection of bounding boxes and scores for a presence of object class instances in those boxes, followed by producing, by a non-maximum suppression layer, final object detections.

A further aspect of the invention is a method of object detection, with an edge computing system that comprises processing circuitry including at least one multi-code graphics processing unit (GPU) having GPU memory, and a multi-core central processing unit (CPU) connected to random access memory (RAM). The processing circuitry is configured with a hybrid convolutional neural network (CNN) and vision transformer backbone network in an object detection neural network. The method can include inputting an image; in a first stage of the backbone network having a convolutional encoder, extracting local features from the input image: in following stages of the backbone network, each following stage having a split depth-wise transpose attention (SDTA) encoder, performing multi-headed self-attention by applying a dot product operation across channel dimensions in order to compute cross-covariance across channels to generate attention feature maps; producing, in the object detection neural network, a fixed-size collection of bounding boxes and scores for a presence of object class instances in those boxes, followed by producing, by a non-maximum suppression layer, final object detections.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
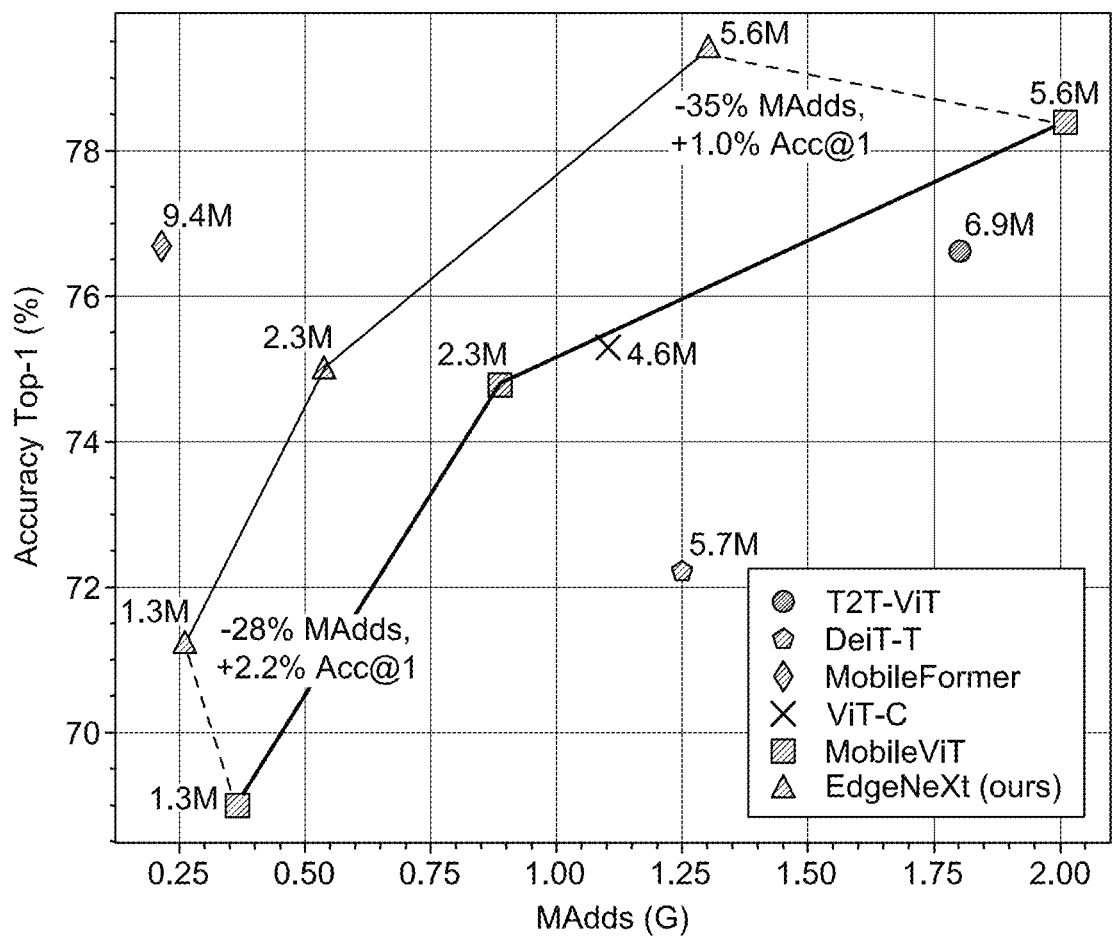
FIG. 1 is a graph for comparison of the EdgeNeXt models with SOTA ViTs and various hybrid architecture designs.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Although deep neural networks are benefiting from increasing graphical processing unit (GPU) performance, resource constrained systems such as mobile platforms require improvements in computational efficiency, i.e., model size and speed. In applications including robotics and self-driving cars, the visual recognition process is preferably both accurate and with low latency. A disclosed solution is a light-weight architecture, referred to herein as EdgeNeXt, that is efficient in terms of model size, parameters and multiply-adds (MAdds), while being superior in accuracy on mobile vision tasks. Specifically, the architecture features a split depth-wise transpose attention (SDTA) encoder that effectively learns both local and global representations to address the issue of limited receptive fields in CNNs without increasing the number of parameters and MAdd operations. Test implementations of the architecture show favorable performance in terms of both accuracy and latency compared to conventional mobile networks on various tasks including image classification, object detection, and semantic segmentation. Embodiments of the light-weight architecture include incorporation as a backbone for a classification network, object detection network, and a semantic segmentation network. The EdgeNeXt backbone with 5.6 M parameters and 1.3 G MAdds achieves 79.4% top-1 ImageNet-1K classification accuracy which is superior to its recently introduced MobileViT counterpart, while requiring 35% less MAdds. For object detection and semantic segmentation tasks, the EdgeNeXt achieves higher mean average precision (mAP) and mean intersection over union (mIOU) with fewer MAdds and a comparable number of parameters, compared to all the conventional lightweight models in literature.

Most existing light-weight approaches typically utilize carefully designed efficient variants of convolutions to achieve a tradeoff between speed and accuracy on resource-constrained mobile platforms. See Forrest N Iandola, Song Han, Matthew W Moskewicz, Khalid Ashraf, William J Dally, and Kurt Keutzer. Squeezenet: Alexnet-level accuracy with 50× fewer parameters and 0.5 mb model size. arXiv preprint arXiv: 1602.07360, 2016; Ningning Ma, Xiangyu Zhang, Hai-Tao Zheng, and Jian Sun. Shufflenet v2: Practical guidelines for efficient cnn architecture design. In *The European Conference on Computer Vision,* 2018; and Mark Sandler, Andrew Howard, Menglong Zhu, Andrey Zhmoginov, and Liang-Chieh Chen. Mobilenetv2: Inverted residuals and linear bottlenecks. In *Proceedings of the IEEE/CVF Conference on Computer Vision and Pattern Recognition,* 2018, each incorporated herein by reference in their entirety. Other than these approaches, a few existing works employ a hardware-aware neural architecture search (NAS) to build low latency accurate models for mobile devices. See Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In *Proceedings of the IEEE/CVF International Conference on Computer Vision,* 2019; and Mingxing Tan, Bo Chen, Ruoming Pang, Vijay Vasudevan, Mark Sandler, Andrew Howard, and Quoc V Le. Mnasnet: Platform-aware neural architecture search for mobile. In *Proceedings of the IEEE/CVF Conference on Computer Vision and Pattern Recognition,* 2019, each incorporated herein by reference in their entirety. While being easy to train and efficient in encoding local image details, these aforementioned light-weight CNNs cannot model global interactions between pixels.

The modeling of global interactions between pixels has been solved with the introduction of self-attention in vision transformers (ViTs). However, this typically comes at the cost of slow inference because of the self-attention computation. See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv: 2010.11929, 2020; and Ze Liu, Yutong Lin, Yue Cao, Han Hu, Yixuan Wei, Zheng Zhang, Stephen Lin, and Baining Guo. Swin transformer: Hierarchical vision transformer using shifted windows. In *Proceedings of the IEEE/CVF International Conference on Computer Vision,* 2021, each incorporated herein by reference in their entirety. Subsequently, modeling of global interaction between pixels is an important challenge for designing a lightweight vision transformer variants for mobile vision applications.

A few recent approaches have investigated designing lightweight architectures for mobile vision tasks by combining the strengths of CNNs and vision transformers. See Sachin Mehta and Mohammad Rastegari. Mobilevit: light-weight, general-purpose, and mobile-friendly vision transformer. In *International Conference on Learning Representations,* 2022; and Haokui Zhang, Wenze Hu, and Xiaoyu Wang. Edgeformer: Improving light-weight convnets by learning from vision transformers. arXiv preprint arXiv: 2203.03952, 2022, each incorporated herein by reference in their entirety. However, these recent approaches mainly focus on optimizing the parameters and result in incurring higher multiply-add (MAdds) operations which restricts high-speed inference on mobile devices. The MAdds are higher since the complexity of the attention block is quadratic with respect to the input size. This becomes further problematic due to multiple attention blocks in the network architecture.

It is desirable to have each of the model size, parameters, and MAdds be small for incorporation into the resource-constrained systems when designing a unified mobile architecture that effectively combines the complementary advantages of CNNs and vision transformers. FIG. 1 is a graph for comparison of the EdgeNeXt models with state of the art (SOTA) ViTs and various hybrid architecture designs. The x-axis shows the multiplication-addition (MAdd) operations and the y-axis displays the top-1 ImageNet-1K classification accuracy. The number of parameters is labeled for each corresponding point in the graph. The EdgeNeXt shows better compute (parameters and MAdds) versus accuracy trade-off compared to conventional approaches.

Figure 2:
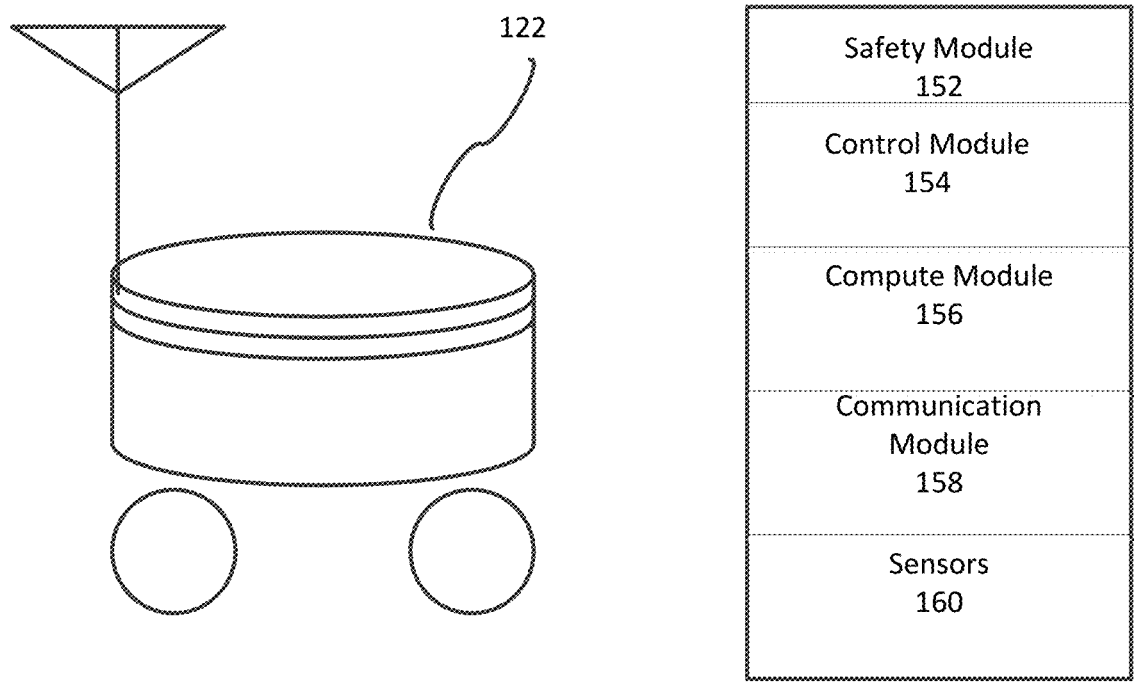
FIG. 2 is a diagram for a non-limiting autonomous mobile robot.

The present disclosed network architecture combines the strengths of both CNN and vision transformer models but with lower compute requirements allowing for incorporation into resource constrained mobile platforms. A type of resource-constrained application that can benefit from the present disclosed network architecture is mobile robotics. FIG. 2 is a diagram for a non-limiting autonomous mobile robot. Although not shown in the figure, the autonomous mobile robot may be equipped with actuators, such as a robotic arm, loader device, access door, depending on types of desired operation. Although shown with two sets of wheels, an autonomous mobile robot may be configured with any number of wheels and installation arrangements. In one embodiment, the autonomous mobile robot 122 is equipped with two pairs of wheels. In one embodiment, the autonomous mobile robot is equipped with three or more pairs of wheels.

The autonomous mobile robot 122 can include at least one circuit board that has various electric circuitry, such as a safety module 152, control module 154, compute module 156, communications module 158, and sensor module 160 or input ports for connections to various sensors.

Figure 3:
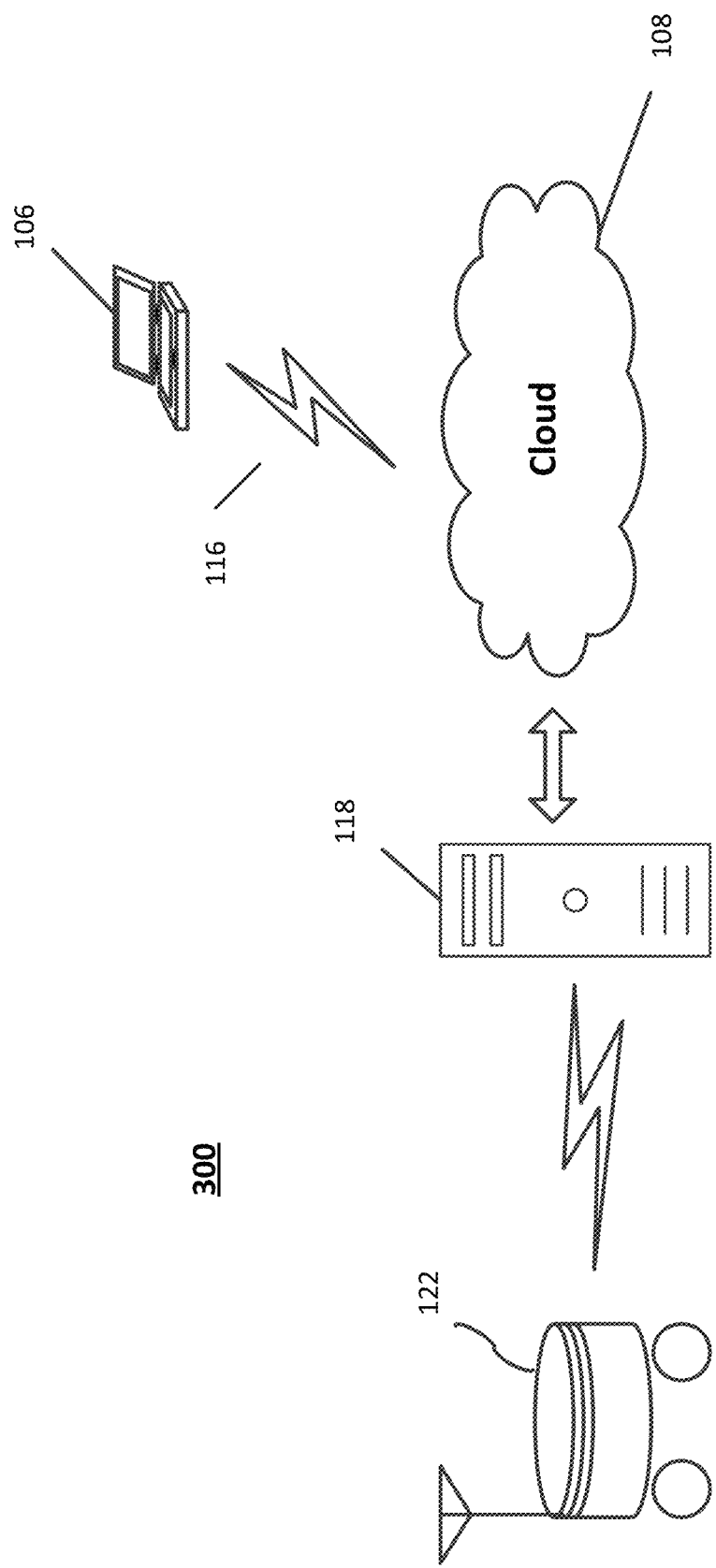
FIG. 3 is a system diagram for monitoring and operation of an autonomous mobile robot.

FIG. 3 is a system diagram for monitoring and operation of an autonomous mobile robot 122. The system 300 can be configured with control functions that are performed in a cloud service 108, or offloaded to and performed in an edge computing system 118. Monitoring and manual operations can be performed from a client computer device 106 which can access the cloud service 108 by way of an internet connection 116. Compute operations associated with machine learning may be performed in the edge computing system 118, or in the cloud service 108. In one embodiment, inference operation using a trained model can be performed in the autonomous mobile robot 122.

One embodiment of the autonomous mobile robot 122 includes a control module 154 and a compute module. The control module 154 may be implemented with an Adrino controller, or other comparable microcomputer-based controller. An operator terminal 106 may communicate with the mobile robot 122 through the cloud service 108. The operator terminal 106 may monitor the status of the mobile robot 122, such as receive data about the current location, current task. The cloud service 108 receives the data transferred by the operator terminal 106 and forwards it to the mobile robot 122. The mobile robot 122 then acts based on the data sent by operator terminal 106.

In one embodiment, the operator terminal 106 may control the mobile robot 122 in potentially hazardous settings, for example when it crosses a street. In particular, the mobile robot 122 may operate autonomously unless a hazardous setting, such as crossing a road is encountered. In such case, the mobile robot 122 may cease motion and request an input from the operator terminal 106. The input may be done through the cloud service 108 by way of wireless Internet connection 116. The operator terminal 106 may control the mobile robot 122 or may send data to facilitate interaction with the surrounds of the mobile robot 122. Once the surrounds are no longer hazardous, the mobile robot 122 may switch back to an autonomous mode of operation.

Compute operations are performed in a compute module 156. Compute operations can include classification, object detection, and semantic segmentation. In one embodiment, the compute module 156 can be an NVIDIA Jetson edge device or other edge computing platform that is capable of performing inference with a machine learning model.

The autonomous mobile robot 122 can move about an unstructured environment that contains at least one moving obstacle. Moving obstacles can be pedestrians, animals, vehicles and/or stationary obstacles such as street signs and garbage bins. The unstructured environment may include roads or walking paths.

The autonomous mobile robot 122 can include various sensors for internal and external measurements of its surrounding environment. The sensors 160 can include, for example, GPS module, cameras, ultrasonic sensors, radar, magnetometer, altitude sensors and one or more odometers. The measurements by the sensors 160 are communicated to a cloud service 108, which performs an analysis of the measurements, and communicates to the robot a command as a result of the analysis. A commend may for example include a change in speed of the robot, and/or a change in the path that the robot is following.

Figure 4:
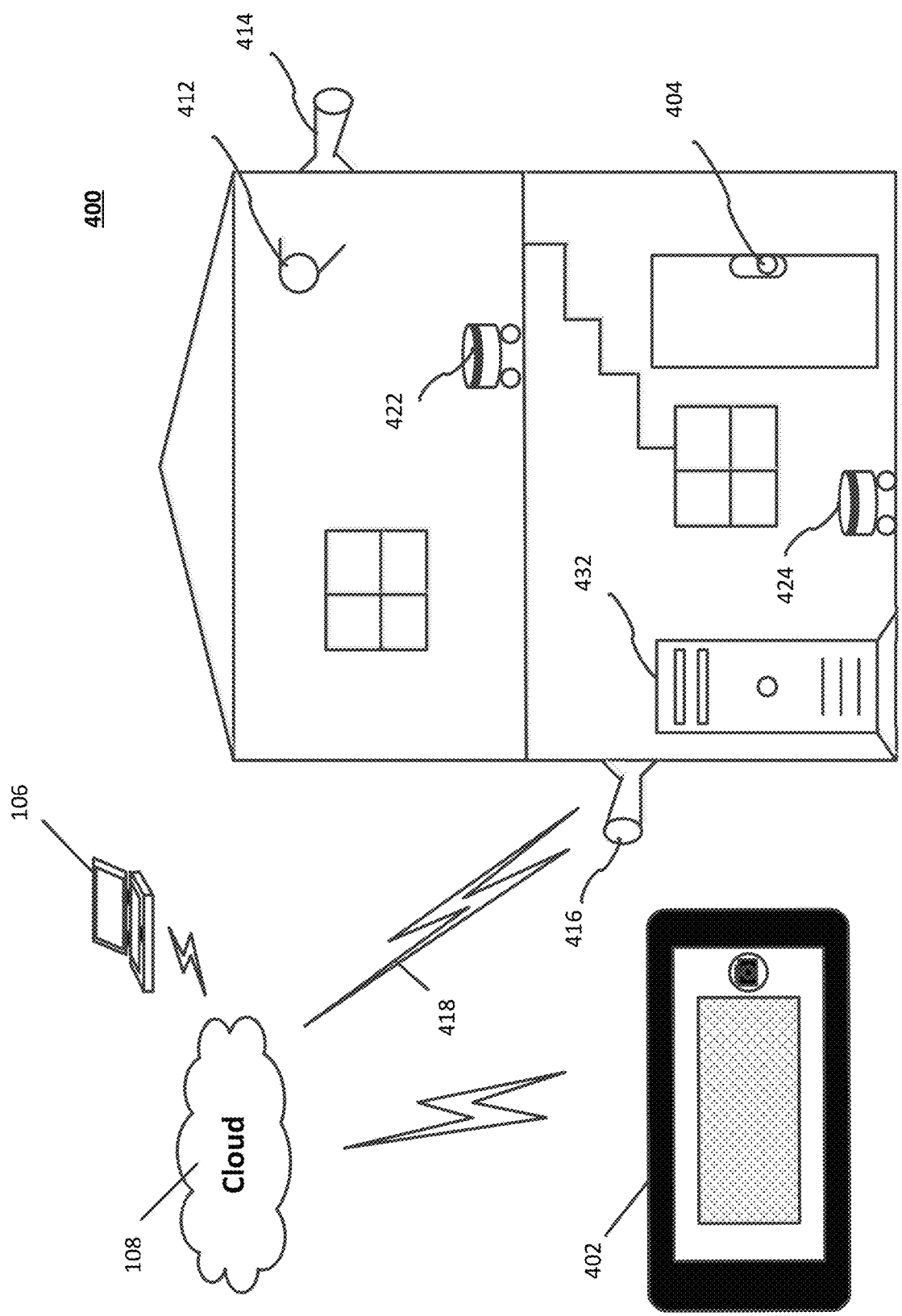
FIG. 4 is a system diagram for an exemplary smart home system.

FIG. 4 is a system diagram for an exemplary smart home system. The exemplary smart home system 400 includes at least one mobile robot 422, 424. The mobile robot 422 can be a mobile delivery robot, mobile vacuum robot, mobile clean-up robot, to name a few, for accomplishing household tasks. The smart home system 400 may include other smart devices, including motion sensors 412, cameras 414, 416, door lock 404, as well as smart appliances, lighting, and security monitoring devices. The smart home system 400 is connected to an external network through at least one router 432, which communicates with the external network by way of a network connection 418. The external network may be a cloud service 108, which can be accessed by one or more client devices 106. The smart home system 400 can include a control interface that is implemented as a mobile App that runs on a smartphone 402, or other personal mobile device. The mobile App can interact with the smart home through a cloud service 108.

In one embodiment, a command can be transmitted using the mobile App to control a mobile robot 422 to perform a task. In an example case of a mobile vacuum robot, a command can be transmitted by the mobile App to the mobile robot 424, to start a vacuum operation. Other commands can include a halt command, a change to low power mode, or manual override commands in a case that the mobile robot 424 becomes stuck. Other types of mobile robots are controlled with different commands. The at least one mobile robot 424, 426 can include at least one camera and other sensors, comparable to the mobile robot of FIG. 2.

Figure 5:
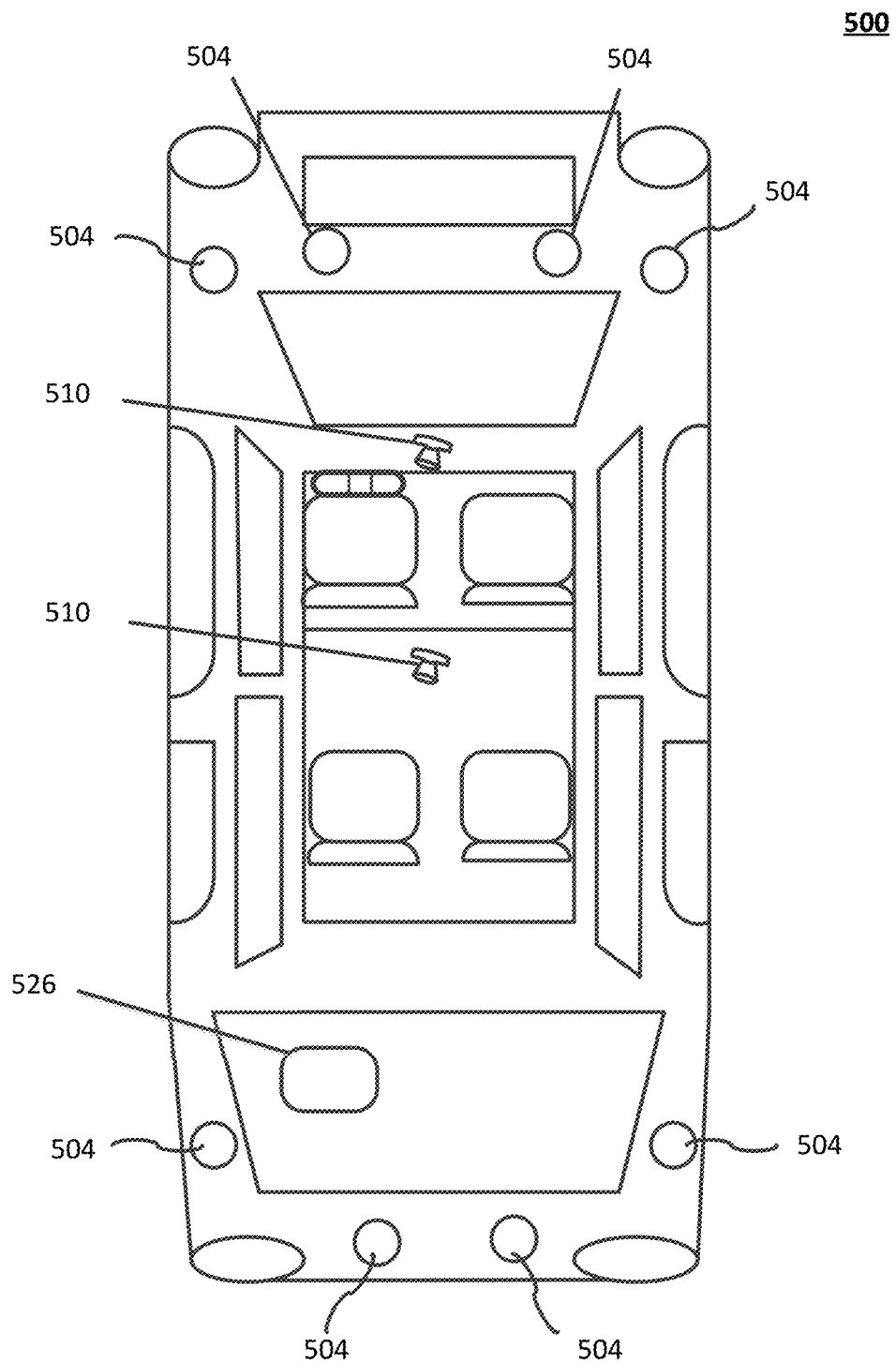
FIG. 5 is an exemplary self-driving car.

FIG. 5 is an exemplary self-driving car. A non-limiting example of a self-driving car 500 can include various types and quantities of exterior cameras 504 and interior cameras 510. Local control of the self-driving car 500 can be performed using at least one vehicle computer unit 526. The vehicle computer unit 526 may include a control module that controls self-driving features and other driver assist features of the vehicle. The vehicle computer unit 526 can contain compute functions to handle computer vision operations based on images received from a camera or a set of cameras.

Figure 6:
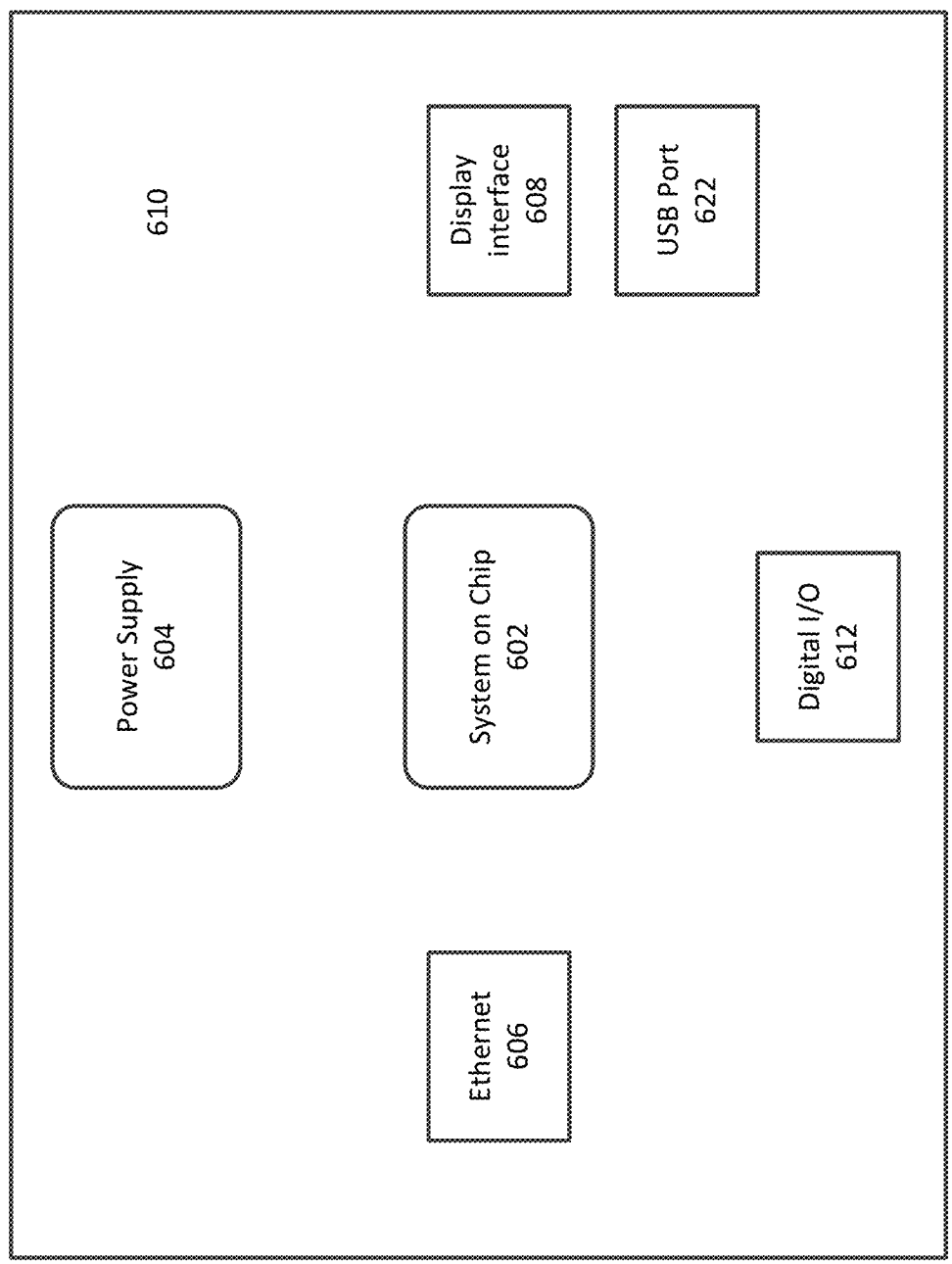
FIG. 6 is a block diagram of exemplary processing circuitry for a compute module.

The compute module 156 of a mobile robot 122, 422, 424 or of a vehicle computer unit 526 can be configured with processing circuitry. FIG. 6 is a block diagram of exemplary processing circuitry for a compute module 156. The processing circuitry can be implemented as an edge computing system 610. The edge computing system 610 can include minimum components of a power supply 604, Ethernet connection interface 606, digital input/output 612, and display interface 608. The edge computing system 610 includes at least one system on chip component 602 for performing various computing tasks.

In an exemplary configuration, the edge computing system 610 has a system on chip component 602 with multiple GPU cores, a multi-core CPU, random access memory, flash memory, a video encoder and decoder. The edge computing system 610 includes a camera connection interface (e.g., USB port 622,) an internet connection 606, a display connection interface 608, and multiple I/O connections 612.

Figure 7:
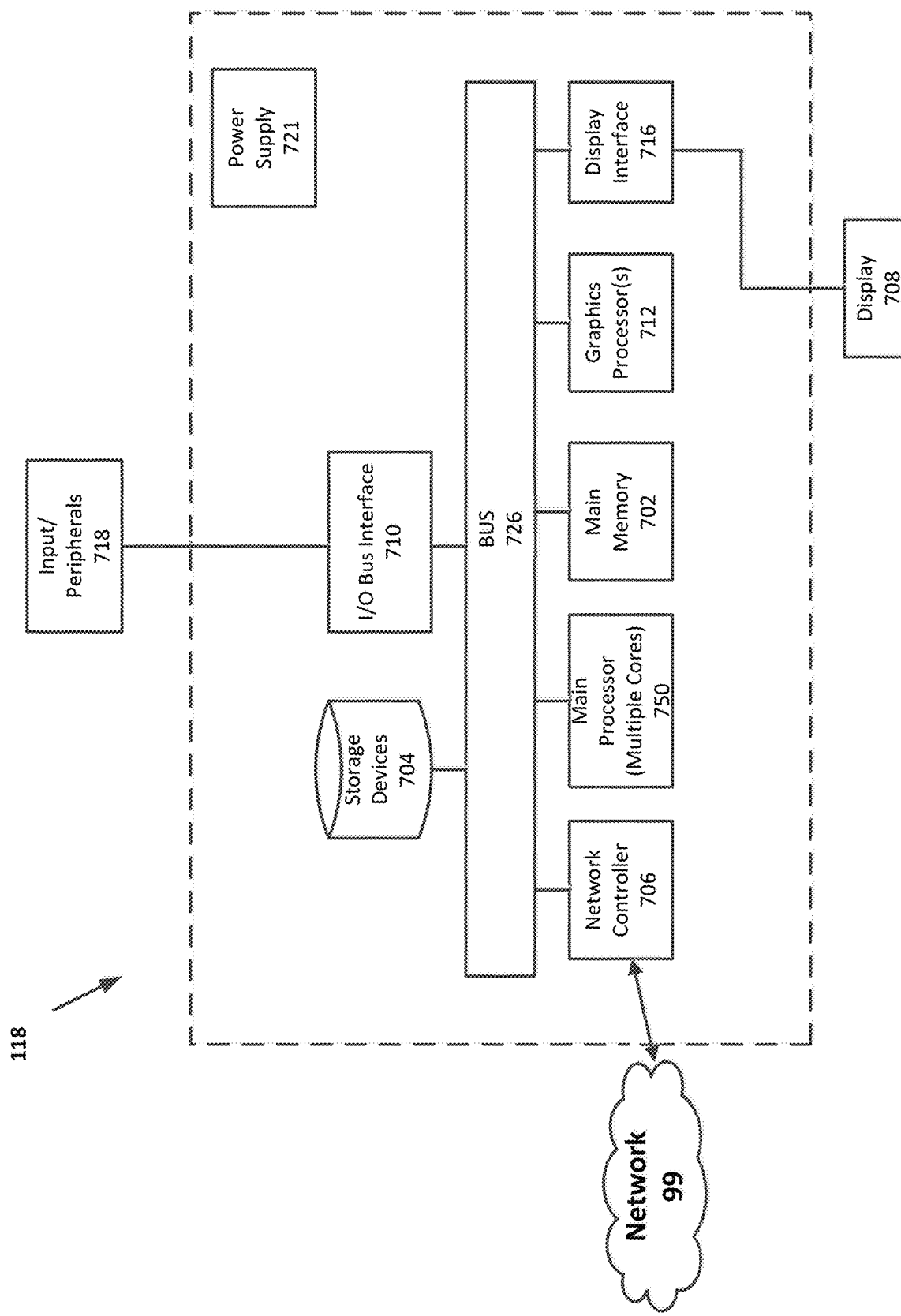
FIG. 7 is a block diagram illustrating an example computer system for implementing training as well as inference methods for a machine learning model according to an exemplary aspect of the disclosure.

FIG. 7 is a block diagram illustrating an example computer system for implementing training as well as inference methods for a machine learning model according to an exemplary aspect of the disclosure. The computer system may be an AI workstation running an operating system, for example Ubuntu Linux OS, Windows, a version of Unix OS, or Mac OS. In some preferred embodiments, the AI workstation is a Lambda GPU workstation that includes Nvidia A100 GPUs. The computer system 700 may include one or more central processing units (CPU) 750 having multiple cores. The computer system 700 may include a graphics board 712 having multiple GPUs, each GPU having GPU memory. The graphics board 712 may perform many of the mathematical operations of the disclosed machine learning methods. The computer system 700 includes main memory 702, typically random access memory RAM, which contains the software being executed by the processing cores 750 and GPUs 712, as well as a non-volatile storage device 704 for storing data and the software programs. Several interfaces for interacting with the computer system 700 may be provided, including an I/O Bus Interface 710, Input/Peripherals 718 such as a keyboard, touch pad, mouse, Display Adapter 716 and one or more Displays 708, and a Network Controller 706 to enable wired or wireless communication through a network 99. The interfaces, memory and processors may communicate over the system bus 726. The computer system 700 includes a power supply 721, which may be a redundant power supply.

In some embodiments, the computer system 700 may include a server CPU and a graphics card by NVIDIA, in which the GPUs have multiple CUDA cores. In some embodiments, the computer system 700 may include a machine learning engine 712.

EdgeNeXt

Embodiments of a compute module 156 include a lightweight hybrid network architecture that effectively fuses the merits of vision transformers and CNNs for low-powered edge systems. In the case of conventional approaches, the computational overhead in vision transformers (e.g., MobileViT) has been determined to be due to the self-attention operation. In contrast to MobileViT, the attention block in the present network architecturel has linear complexity with respect to the input spatial dimension of $O(Nd^2)$, where N is the number of patches, and d is the feature/channel dimension. The self-attention operation in the present framework is applied across channel dimensions instead of the spatial dimension. Furthermore, it is demonstrated that with a much lower number of attention blocks (3 versus 9 in MobileViT), the present framework can surpass their performance mark. In this way, the disclosed framework can model global representations with a limited number of MAdds which is one criterion to ensure low-latency inference on edge systems. The present framework has two desirable properties.

a) Encoding the global information efficiently. The intrinsic characteristic of self-attention to learn global representations is crucial for vision tasks. To inherit this advantage efficiently, the present framework uses cross-covariance attention to incorporate the attention operation across the feature channel dimension instead of the spatial dimension within a relatively small number of network blocks. This reduces the complexity of the original self-attention operation from quadratic to linear in terms of number of tokens and implicitly encodes the global information effectively.

b) Adaptive kernel sizes. Large-kernel convolutions are known to be computationally expensive since the number of parameters and FLOPs (floating point operations) quadratically increases as the kernel size grows. Although a larger kernel size is helpful to increase the receptive field, using such large kernels across the whole network hierarchy is computationally expensive and sub-optimal. In the present framework an adaptive kernel size mechanism is used to reduce this complexity and capture different levels of features in the network. Inspired by the hierarchy of the CNNs, smaller kernels are used at the early stages, while larger kernels are used at the latter stages in the convolution encoder blocks. This design choice is optimal as early stages in CNN usually capture low-level features and smaller kernels are suitable for this purpose. However, in later stages of the network, large convolutional kernels are required to capture high-level features. See Matthew D Zeiler and Rob Fergus. Visualizing and understanding convolutional networks. In *The European Conference on Computer Vision*, 2014, incorporated herein by reference in its entirety. The architectural details are described next.

Figure 8:
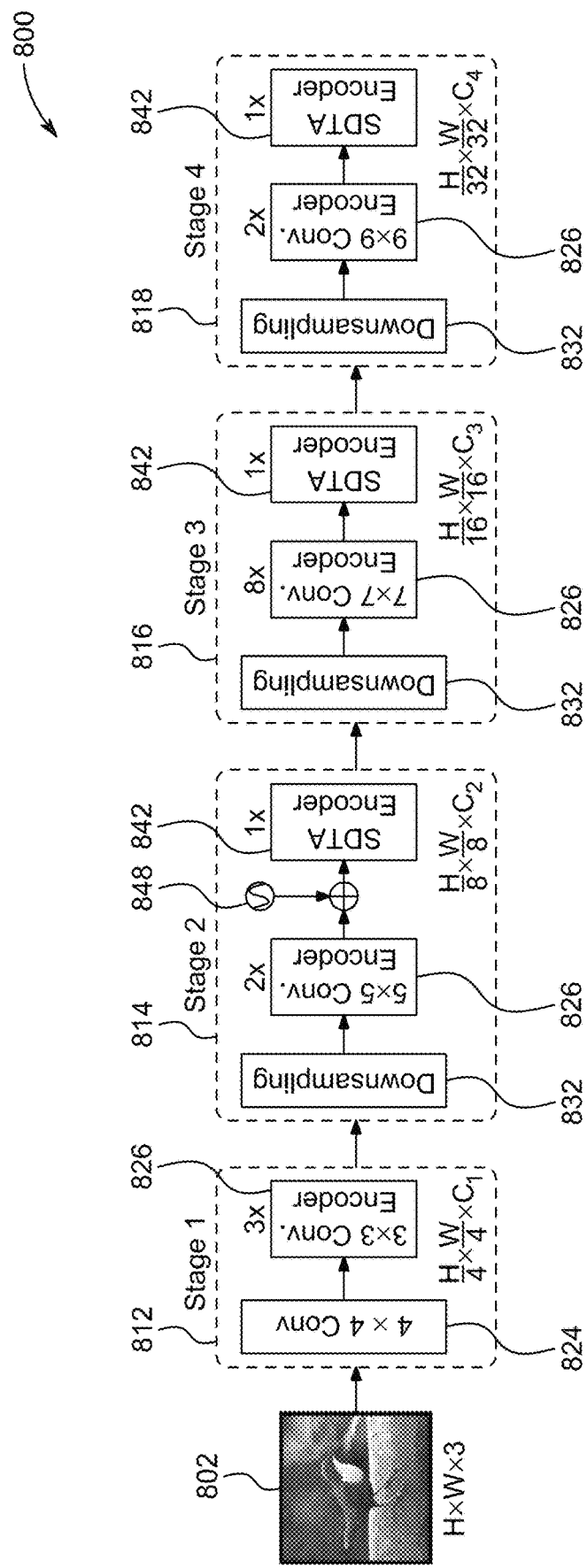
FIG. 8 is a block diagram of the EdgeNeXt framework architecture according to an exemplary aspect of the disclosure.

Overall Architecture. FIG. 8 is a block diagram of the EdgeNeXt framework architecture. The main components are two-fold: (1) adaptive N×N Convolution Encoder (see FIG. 9), and (2) split depth-wise transpose attention (SDTA) encoder (see FIG. 10). The EdgeNeXt architecture extracts hierarchical features at four different scales across the four stages 812, 814, 816, 818. The first stage 812 downsamples the input image to $\frac{1}{4}^{th}$ resolution using 4×4 strided convolution 824 followed by three 3×3 Convolution (Conv.) encoders 826. In stages 2-4, 2×2 strided convolutions 832 are used for downsampling at the start, followed by N×N Convolution 826 and the Split depth-wise Transpose Attention (SDTA) encoders 842. In particular, an input image 802 of size H×W×3 is passed through a patchify stem layer at the beginning of the network, implemented using a 4×4 non-overlapping convolution followed by a layer norm, which results in $$\frac{H}{4} \times \frac{W}{4} \times C1$$

feature maps. Then, the output of the layer norm is passed to the 3×3 Convolution Encoder 826 to extract local features. The second stage 814 begins with a downsampling layer 832 implemented using 2×2 strided convolution that reduces the spatial sizes by half and increases the channels, resulting in $$\frac{H}{8} \times \frac{W}{8} \times C2$$

feature maps, followed by two consecutive 5×5 Convolution Encoders 826. Positional Encoding (PE) 848 is also added before the SDTA block 842 in the second stage only. The PE is sensitive for dense prediction tasks (e.g., object detection and segmentation) as well as adding it in all stages increases the latency of the network. Hence, PE is added only once in the network to encode the spatial location information. The output feature maps are further passed to the third 816 and fourth 818 stages, to generate $$\frac{H}{16} \times \frac{W}{16} \times C3 \text{ and } \frac{H}{32} \times \frac{W}{32} \times C4$$

dimensional features, respectively.

Figure 9:
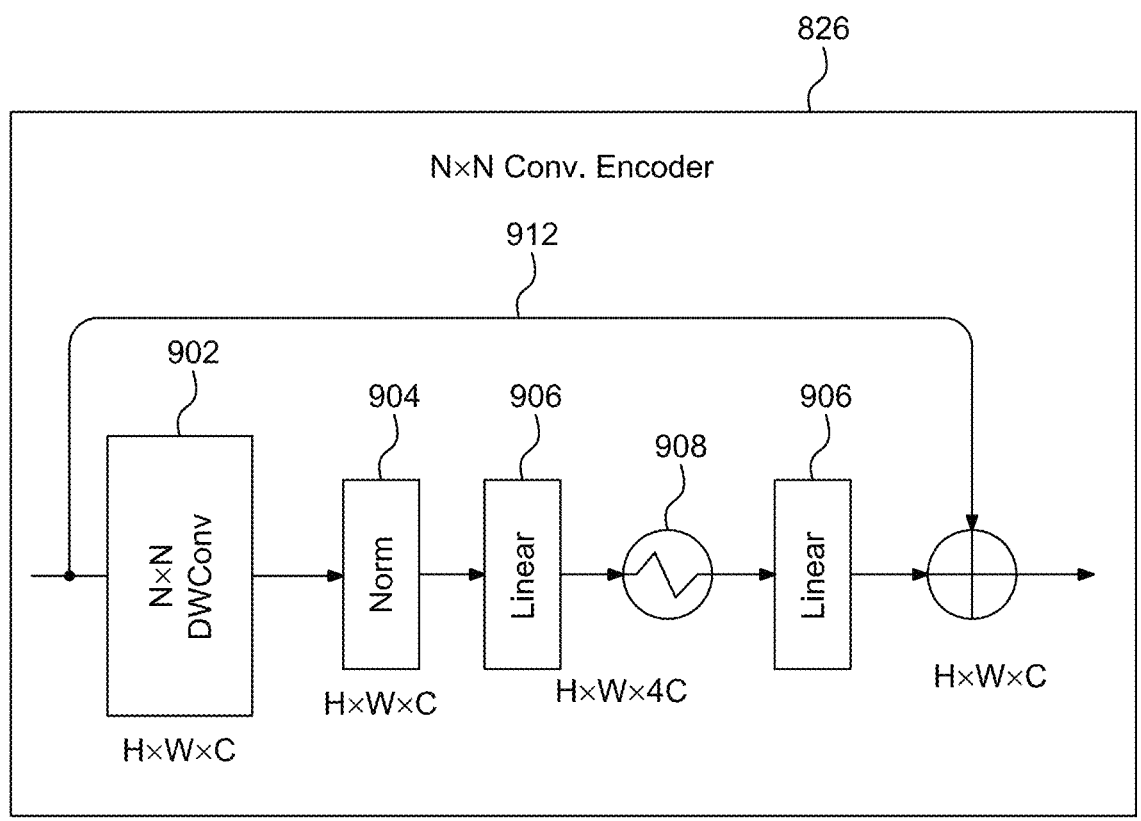
FIG. 9 is a block diagram of an adaptive N×N Convolution Encoder according to an exemplary aspect of the disclosure.

Convolution Encoder. FIG. 9 is a block diagram of a N×N Convolution Encoder 826 which varies for each stage. This Convolution Encoder block 826 consists of depth-wise separable convolution 902 with adaptive kernel sizes. Block 826 can be defined by two separate layers: (1) depth-wise convolution 902 with adaptive N×N kernels. k=3, 5, 7, and 9 are used for stages 1, 2, 3, and 4, respectively. Then, (2) two pointwise convolution layers are used to enrich the local representation alongside standard Layer Normalization (LN) 904 and Gaussian Error Linear Unit (GELU) 908 activation for non-linear feature mapping. See Jimmy Lei Ba, Jamie Ryan Kiros, and Geoffrey E Hinton. Layer normalization. arXiv preprint arXiv: 1607.06450, 2016; and Dan Hendrycks and Kevin Gimpel. Gaussian error linear units (gelus). arXiv preprint arXiv: 1606.08415, 2016, each incorporated herein by reference in their entirety. Further, a skip connection 912 is added to make information flow across the network hierarchy. Unlike the conventional ConvNeXt block the kernel sizes are dynamic and vary depending on the stage. It has been determined that adaptive kernel sizes in the Convolution encoder perform better compared to static kernel sizes (Table 7). The Convolution encoder 826 can be represented in the following formula:

$$x_{i+1} = x_i + \text{Linear}_G(\text{Linear}(\text{LN}(Dw(x_i)))), \quad (1)$$

where $x_i$ denotes the input feature maps of shape H×W×C, $\text{Linear}_G$ is a point-wise convolution layer 906 followed by GELU 908, Dw is k×k depth-wise convolution 902, LN is a normalization layer 904, and $x_{i+1}$ denotes the output feature maps of the Convolution Encoder 826.

Figure 10:
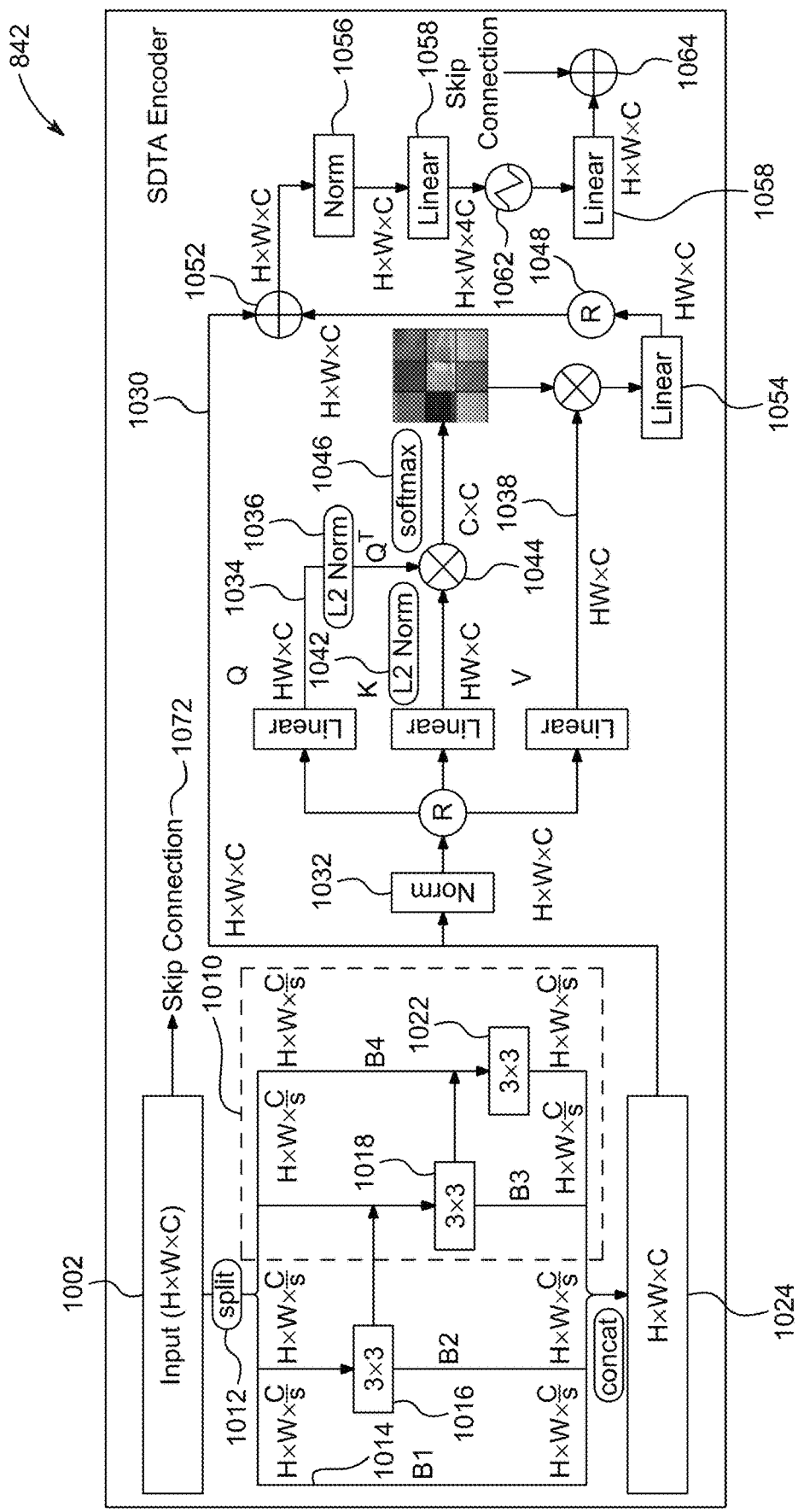
FIG. 10 is a block diagram of a split depth-wise transpose attention (SDTA) encoder according to an exemplary aspect of the disclosure.

SDTA Encoder. FIG. 10 is a block diagram of the SDTA encoder 842. There are two main components in the split depth-wise transpose attention (SDTA) encoder 842. The first component 1010 strives to learn an adaptive multi-scale feature representation by encoding various spatial levels within the input image and the second part 1030 implicitly encodes global image representations. The first part 1010 of the encoder is inspired by Res2Net where a multi-scale processing approach is adapted by developing hierarchical representation into a single block. See Shang-Hua Gao, Ming-Ming Cheng, Kai Zhao, Xin-Yu Zhang, Ming-Hsuan Yang, and Philip Torr. Res2net: A new multi-scale backbone architecture. *IEEE Transactions on Pattern Analysis and Machine Intelligence*, 43(2):652-662, 2019, incorporated herein by reference in its entirety. This makes the spatial receptive field of the output feature representation more flexible and adaptive. Different from Res2Net, the first block 1010 in the SDTA encoder does not use the 1×1 pointwise convolution layers thereby ensuring a lightweight network with a constrained number of parameters and MAdds. Also, an adaptive number of subsets per stage are used to allow effective and flexible feature encoding. In the STDA encoder 842, the input tensor 1002 H×W×C is split 1012 into s subsets, each subset is denoted by $x_i$ and has the same spatial size with C/s channels, where $i \in \{1, 2, \ldots, s\}$ and C is the number of channels. Each feature maps subset (except the first subset 1014) is passed to 3×3 depth-wise convolution 1016, 1018, 1022, denoted by $d_i$, and the output 1024 is denoted by $y_i$. Also, the output of $d_{i-1}$, denoted by $y_{i-1}$, is added to the feature subset $x_i$, and then fed into $d_i$. The number of subsets s is adaptive based on the stage number t, where $t \in \{2, 3, 4\}$. $y_i$ is as follows:

$$y_i = \begin{cases} x_i & i = 1; \\ d_i(x_i) & i = 2, t = 2; \\ d_i(x_i + y_{i-1}) & 2 < i \le s, t. \end{cases} \quad (2)$$

In other words, each depth-wise operation $d_i$, as shown in SDTA encoder in FIG. 8, receives feature maps output from all previous splits $\{x_j, j \le i\}$.

As mentioned earlier, the overhead of the transformer self-attention layer is infeasible for vision tasks on real time edge systems because it comes at the cost of a higher number of MAdds and high latency. To alleviate this issue and encode the global context efficiently, the architecture uses transposed query and key attention feature maps in the SDTA encoder 842. See Alaaeldin Ali, Hugo Touvron, Mathilde Caron, Piotr Bojanowski, Matthijs Douze, Armand Joulin, Ivan Laptev, Natalia Neverova, Gabriel Synnaeve, Jakob Verbeek, et al. Xcit: Cross-covariance image transformers. *Advances in Neural Information Processing Systems*, 2021, incorporated herein by reference in its entirety. This transposed query and key attention operation has a linear complexity by applying the dot-product operation of the multi-head scaled dot-product attention (MSA) across channel dimensions instead of the spatial dimension, which allows computing of cross-covariance across channels to generate attention feature maps that have implicit knowledge about the global representations. In operation, given a normalized tensor 1032 Y of shape H×W×C, compute query (Q), key (K), and value (V) projections using three linear layers 1034, 1036, 1038, yielding Q=$W^Q$Y, K=$w^K$Y, and V=$W^V$Y, with dimensions HW×C, where $W^Q$, $W^K$, and $W^V$ are the projection weights for Q, K, and V respectively. Then, an L2 norm 1042 is applied to Q and K before computing the cross-covariance attention as it stabilizes the training. Instead of applying the dot-product between Q and $K^T$ along the spatial dimension i.e., (HW×C)·(C×HW), apply the dot-product 1044 across the channel dimensions between $Q^T$ and K i.e., (C×HW)·(HW×C), producing a C×C softmax scaled attention score matrix 1046. To get the final attention maps, the scores 1046 are multiplied 1048 by V 1038 and summed 1052. The overall transposed attention operation can be expressed as in the following formula:

$$\hat{X} = \text{Attention}(Q, K, V) + X, \quad s.t., \quad \text{Attention}(Q, K, V) = V \cdot \text{softmax}(Q^T \cdot K) \quad (3)$$

where X is the input and $\hat{X}$ is the output feature tensor. After that, two 1×1 pointwise convolution layers, LN 1058 and GELU activation 1062 are used to generate non-linear features. Table 1 shows the sequence of Convolution and STDA encoders with the corresponding input size at each layer with more design details about various modules including extra-extra small, extra-small and small models.

Table 1 contains data that describes the models' layers with respect to output size, kernel size, and output channels, repeated n times, along with the models MAdds and parameters. The number of the output channels for small, extra-small, and extra-extra small models is chosen to match the number of parameters with the conventional MobileViT model. Adaptive kernel sizes are used in the Convolution Encoder to reduce the model complexity and capture different levels of features. Also, the output size of the last stage is padded to be able to apply the 9×9 filter.

TABLE 1

EdgeNeXt Architectures.

| Layer | Output Size | #Layers(n) | Kernel | Output Channels XXS | XS | S |
|---|---|---|---|---|---|---|
| Image | 256 × 256 | 1 | — | — | | |
| Stem | 64 × 64 | 1 | 4 × 4 | 24 | 32 | 48 |
| Conv. Encoder | 64 × 64 | 3 | 3 × 3 | 24 | 32 | 48 |
| Downsampling | 32 × 32 | 1 | 2 × 2 | 48 | 64 | 96 |
| Conv. Encoder | 32 × 32 | 2 | 5 × 5 | 48 | 64 | 96 |
| STDA Encoder | 32 × 32 | 1 | — | 48 | 64 | 96 |
| Downsampling | 16 × 16 | 1 | 2 × 2 | 88 | 100 | 160 |
| Conv. Encoder | 16 × 16 | 8 | 7 × 7 | 88 | 100 | 160 |
| STDA Encoder | 16 × 16 | 1 | — | 88 | 100 | 160 |
| Downsampling | 8 × 8 | 1 | 2 × 2 | 168 | 192 | 304 |
| Conv. Encoder | 8 × 8 | 2 | 9 × 9 | 168 | 192 | 304 |
| STDA Encoder | 8 × 8 | 1 | — | 168 | 192 | 304 |
| Global Average Pooling | 1 × 1 | 1 | — | — | — | — |

TABLE 1-continued

EdgeNeXt Architectures.

| Layer | Output Size | #Layers(n) | Kernel | Output Channels | | |
|---|---|---|---|---|---|---|
| | | | | XXS | XS | S |
| Linear | 1 × 1 | 1 | — | 1000 | 1000 | 1000 |
| Model MAdds | | | | 0.3G | 0.5G | 1.3G |
| Model Parameters | | | | 1.3M | 2.3M | 5.6M |

Experiments

In this section, the EdgeNext model is evaluated on ImageNet-1K classification, COCO object detection, and Pascal VOC segmentation benchmarks.

Dataset

Use ImageNet-1K dataset in all classification experiments. The dataset provides approximately 1.28 M training and 50K validation images for 1000 categories. Following the literature, top-1 accuracy is reported on the validation set for all experiments. For object detection, the COCO dataset is used which provides approximately 118k training and 5k validation images respectively. See Tsung-Yi Lin, Michael Maire, Serge Belongie, James Hays, Pietro Perona, Deva Ramanan, Piotr Dollár, and C Lawrence Zitnick. Microsoft coco: Common objects in context. In *The European Conference on Computer Vision*, 2014, incorporated herein by reference in its entirety. For segmentation, Pascal VOC 2012 dataset is used which provides almost 10k images with semantic segmentation masks. See Mark Everingham, Luc Van Gool, Christopher K I Williams, John Winn, and Andrew Zisserman. The Pascal Visual Object Classes (VOC) Challenge. *International Journal of Computer Vision*, 88(2):303-338, 2010, incorporated herein by reference in its entirety. Following the standard practice as in Mehta et al., extra data and annotations from Lin et al. and Hariharan et al. are used as well. See Bharath Hariharan, Pablo Arbelaez, Lubomir Bourdev, Subhransu Maji, and Jitendra Malik. Semantic contours from inverse detectors. In *Proceedings of the IEEE/CVF International Conference on Computer Vision*, 2011, each incorporated herein by reference in their entirety.

Implementation Details

The EdgeNeXt models are trained at an input resolution of 256×256 with an effective batch size of 4096. All the experiments are run for 300 epochs with AdamW optimizer, and with a learning rate and weight decay of 6e-3 and 0.05 respectively. See Ilya Loshchilov and Frank Hutter. Decoupled weight decay regularization. In *International Conference on Learning Representations*, 2019, incorporated herein by reference in its entirety. The cosine learning rate schedule is used with linear warmup for 20 epochs. See Ilya Loshchilov and Frank Hutter. Sgdr: Stochastic gradient descent with warm restarts. In *International Conference on Learning Representations*, 2017, incorporated herein by reference in its entirety. The data augmentations used during training are Random Resized Crop (RRC), Horizontal Flip, and RandAugment, where RandAugment is only used for the EdgeNeXt-S model. See Ekin Dogus Cubuk, Barret Zoph, Jon Shlens, and Quoc Le. Randaugment: Practical automated data augmentation with a reduced search space. In *Advances in Neural Information Processing Systems*, 2020, incorporated herein by reference in its entirety. Also a multi-scale sampler is used during training. Further stochastic depth with a rate of 0.1 is used for EdgeNeXt-S model only. See Gao Huang, Yu Sun, Zhuang Liu, Daniel Sedra, and Kilian Q Weinberger. Deep networks with stochastic depth. In *The European Conference on Computer Vision*, 2016, incorporated herein by reference in its entirety. EMA is used with a momentum of 0.9995 during training. See Boris T Polyak and Anatoli B Juditsky. Acceleration of stochastic approximation by averaging. *SIAM journal on control and optimization*, 1992, incorporated herein by reference in its entirety. For inference, the images are resized to 292×292 followed by a center crop at 256×256 resolution. Also the accuracy of the EdgeNeXt-S model is trained and reported at 224×224 resolution for a fair comparison with previous methods. The classification experiments are run on eight A100 GPUs with an average training time of almost 30 hours for the EdgeNeXt-S model.

For detection and segmentation tasks, the EdgeNeXt is finetuned following similar settings as in Mehta et al. and mean average precision (mAP) is reported at intersection over union (IOU) of 0.50-0.95 and mean intersection over union (mIOU) respectively. The experiments are run on four A100 GPUs with an average training time of ~36 and ~7 hours for detection and segmentation respectively.

Mean Average Precision (mAP) is a performance metric used for evaluating machine learning models. Mean Average Precision or mAP is the average of AP over all detected classes, where AP is the area under the precision-recall curve.

Intersection over Union (IoU) is an evaluation metric used to measure the accuracy of an object detector on a particular dataset. Generally, Intersection over Union is a metric that quantifies the degree of overlap between two regions. IoU metric evaluates the correctness of a prediction. The value ranges from 0 to 1.

Also the latency of the models is reported on NVIDIA Jetson Nano and NVIDIA A100 40 GB GPU. For Jetson Nano, all the models are converted to TensorRT engines and perform inference in FP16 mode using a batch size of 1. For A100, similar to Zhuang Liu et al., use PyTorch v1.8.1 with a batch size of 256 to measure the latency.

Image Classification

Table 2 shows data that compares the EdgeNext model with conventional state-of-the-art fully convolutional (ConvNets), transformer-based (ViTs) and hybrid architecture designs. Overall, the present model demonstrates better accuracy versus compute (parameters and MAdds) trade-off compared to all three categories of methods. See the graph in FIG. 1 of classification accuracy and multiplication-addition (Madd) operations.

Table 2 contains data of classification performance comparison of the EdgeNeXt model with state-of-the-art lightweight fully convolutional, transformer-based, and hybrid models on the ImageNet-1K validation set. The model outperforms the SOTA models and achieves a better tradeoff between accuracy and compute (i.e., parameters and multiplication-addition (MAdds) operations).

TABLE 2

Classification performance comparison of the EdgeNeXt model with state-of-the-art lightweight fully convolutional, transformer-based, and hybrid models on the ImageNet-1K validation set.

| Frameworks | Models | Date | Input | Params↓ | MAdds↓ | Top1↑ |
|---|---|---|---|---|---|---|
| ConvNets | MobileNetV2 | CVPR2018 | 224 | 6.9M | 585M | 74.7 |
| | ShuffleNetV2 | ECCV2018 | 224 | 5.5M | 597M | 74.5 |
| | MobileNetV3 | ICCV2019 | 224 | 5.4M | 219M | 75.2 |

TABLE 2-continued

Classification performance comparison of the
EdgeNeXt model with state-of-the-art
lightweight fully convolutional, transformer-based,
and hybrid models on the ImageNet-1K
validation set.

| Frameworks | Models | Date | Input | Params↓ | MAdds↓ | Top1↑ |
|---|---|---|---|---|---|---|
| ViTs | T2T-ViT | ICCV2021 | 224 | 6.9M | 1.80G | 76.5 |
|  | DeiT-T | ICML2021 | 224 | 5.7M | 1.25G | 72.2 |
| Hybrid | Mobile-Former | CORR2021 | 224 | 9.4M | 214M | 76.7 |
|  | ViT-C | NeurIPS2021 | 224 | 4.6M | 1.10G | 75.3 |
|  | CoaT-Lite-T | ICCV2021 | 224 | 5.7M | 1.60G | 77.5 |
|  | MobileViT-S | ICLR2022 | 256 | 5.6M | 2.01G | 78.4 |
|  | EdgeNeXt-S | Present | 224 | 5.6M | 965M | 78.8 |
|  | EdgeNeXt-S | Present | 256 | 5.6M | 1.30G | 79.4 |

As can be seen in Table 2, EdgeNeXt surpasses lightweight ConvNets by a formidable margin in terms of top-1 accuracy with similar parameters. Normally, ConvNets have less MAdds compared to transformer and hybrid models because of no attention computation, however, they lack the global receptive field. For instance, EdgeNeXtS has higher MAdds compared to MobileNetV2, but it obtains 4.1% gain in top-1 accuracy with less number of parameters. Also, the EdgeNeXt-S outperforms ShuffleNetV2 and MobileNetV3 by 4.3% and 3.6% respectively, with comparable number of parameters.

Also, the EdgeNeXt outperforms recent ViT variants on ImageNet1K dataset with fewer parameters and MAdds. For example, EdgeNeXt-S obtains 78.8% top-1 accuracy, surpassing T2T-ViT and DeiTT by 2.3% and 6.6% absolute margins respectively. See Li Yuan, Yunpeng Chen, Tao Wang, Weihao Yu, Yujun Shi, Zi-Hang Jiang, Francis E H Tay, Jiashi Feng, and Shuicheng Yan. Tokens-to-token vit: Training vision transformers from scratch on imagenet. In *Proceedings of the IEEE/CVF International Conference on Computer Vision,* 2021; and Touvron et al., each incorporated herein by reference in their entirety.

Also, as can be seen in Table 2, EdgeNeXt outperforms MobileFormer, ViT-C, CoaT-Lite-T with less parameters and fewer MAdds. See Yinpeng Chen et al.; Xiao et al.; and Zihang Dai, Hanxiao Liu, Quoc Le, and Mingxing Tan. Coatnet: Marrying convolution and attention for all data sizes. *Advances in Neural Information Processing Systems,* 2021, each incorporated herein by reference in their entirety. Regarding Table 3, for a fair comparison with MobileViT, the present model is trained at an input resolution of 256× 256 and consistent gains are shown for different models sizes (i.e., S, XS, and XXS) with fewer MAdds and faster inference on the edge systems. For instance, the EdgeNeXt-XXS model achieves 71.2% top-1 accuracy with only 1.3 M parameters, surpassing corresponding MobileViT model by 2.2%. The EdgeNeXt-S model attains 79.4% accuracy on ImageNet with only 5.6 M parameters, a margin of 1.0% as compared to the corresponding MobileViT-S model. This demonstrates the effectiveness and the generalization of the present design.

Table 3 contains data of a comparison of different variants of EdgeNeXt with the counterpart models of MobileViT. The last two columns list the latency in ms and μs on Jetson Nano and A100 devices, respectively. It can be seen that the EdgeNext models provide higher accuracy with lower latency for each model size.

TABLE 3

Comparison of different variants of EdgeNeXt with the counterpart models of MobileViT.

| Model | Date | Input | Params↓ | MAdds↓ | Top1↑ | Jetson↓ | A100↓ |
|---|---|---|---|---|---|---|---|
| MobileViT-XXS |  |  | 1.3M | 364M | 69.0 | 21.0 ms | 216 μs |
| MobileViT-XS | ICLR2022 | 256 | 2.3 | 886M | 74.8 | 35.1 ms | 423 μs |
| MobileViT-S |  |  | 5.6M | 2.01G | 78.4 | 53.0 ms | 559 μs |
| EdgeNeXt-XXS |  |  | 1.3M | 261M | 71.2 | 19.3 ms | 142 μs |
| EdgeNeXt-XS | Present | 256 | 2.3M | 538M | 75.0 | 31.6 ms | 227 μs |
| EdgeNeXt-S |  |  | 5.6M | 1.30G | 79.4 | 48.8 ms | 332 μs |

Inference on Edge Systems

Regarding Table 3, the inference time of the EdgeNeXt models is computed on the NVIDIA Jetson Nano edge device and compared with the state-of-the-art MobileViT model. All the models are converted to TensorRT engines and inference is performed in FP16 mode. The model attains low latency on the edge system with similar parameters, fewer MAdds, and higher top-1 accuracy. Table 3 also lists the inference time on A100 GPU for both MobileViT and EdgeNeXt models. It can be observed that the EdgeNeXtXXS model is ~34% faster than the MobileViT-XSS model on A100, indicating that EdgeNeXt better utilizes the advanced hardware as compared to MobileViT.

ImageNet-21K Pretraining

To further explore the capacity of EdgeNeXt, an EdgeNeXt-B model has been developed with 18.5 M parameters and 3.8MAdds and pretrained on a subset of ImageNet-21K dataset followed by finetuning on the standard ImageNet-1K dataset. ImageNet-21K (winter' 21 release) contains around 13 M images and 19K classes. Pretraining data is preprocessed by removing classes with fewer examples and split it into training and validation sets containing around 11 M and 522K images respectively over 10,450 classes. This dataset is referred to as ImageNet-21K-P. Further, the ImageNet-21K-P training is initialized with ImageNet-1K pretrained model for faster convergence. Finally, ImageNet-21K model is finetuned on ImageNet-1K for 30 epochs with a learning rate of 7.5e-5 and an effective batch size of 512.

Object Detection

Figure 11:
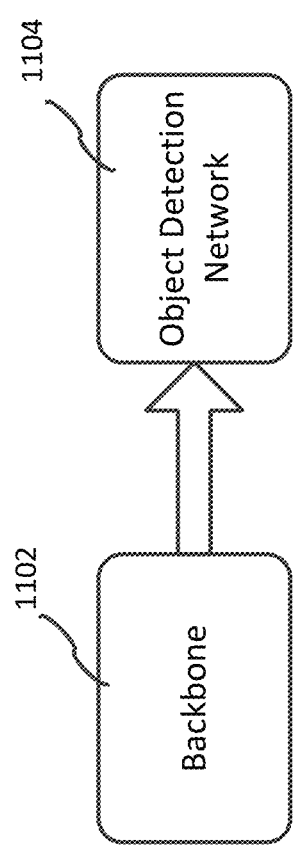
FIG. 11 is a block diagram for an object detection network architecture according to an exemplary aspect of the disclosure.
Figure 12:
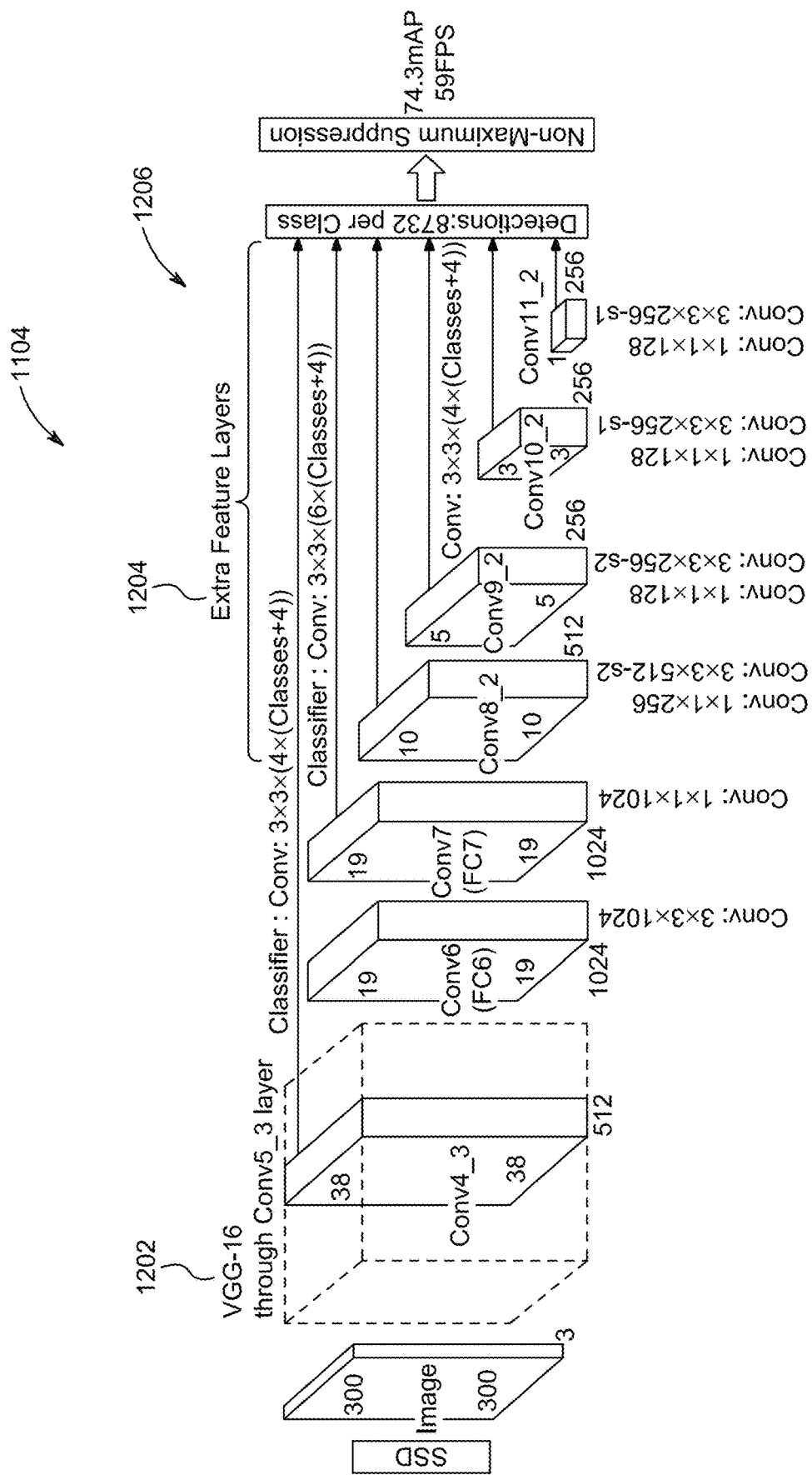
FIG. 12 is a block diagram of the network architecture for the single shot multibox detector (SSD)

FIG. 11 is a block diagram for an object detection network architecture. In order to perform object detection, the EdgeNeXt is used as a backbone 1102 in SSDLite 1104 and the model is finetuned on COCO 2017 dataset at an input resolution of 320×320. The EdgeNeXt backbone architecture is used for feature extraction over an input image, and the SSDLite network is for bounding-box recognition. The difference between SSD and SSDLite is that the standard convolutions are replaced with separable convolutions in the SSD head. The architecture for the original single shot multibox detector (SSD) is illustrated in FIG. 12. See Wei Liu, Dragomir Anguelov, Dumitru Erhan, Christian Szegedy, Scott Reed, Cheng-Yang Fu, and Alexander C Berg. Ssd: Single shot multibox detector. In *The European Conference on Computer Vision*, 2016, incorporated herein by reference in its entirety.

The SSD discretizes the output space of bounding boxes into a set of default boxes over different aspect ratios and scales per feature map location. At prediction time, the network generates scores for the presence of each object category in each default box and produces adjustments to the box to better match the object shape. Additionally, the network combines predictions from multiple feature maps with different resolutions to naturally handle objects of various sizes.

The SSD is based on a feed-forward convolutional network that produces a fixed-size collection of bounding boxes and scores for the presence of object class instances in those boxes, followed by a non-maximum suppression step to produce the final detections. The early network layers are based on a standard architecture used for high quality image classification (truncated before any classification layers), which is the base network 1202. The VGG-16 network is used as a base network. An auxiliary structure 1204 is added to the network to produce the final detections.

In the auxiliary structure 1204, convolutional feature layers are added to the end of the truncated base network 1202. These layers decrease in size progressively and allow predictions of detections at multiple scales. The convolutional model for predicting detections is different for each feature layer. Each added feature layer (or optionally an existing feature layer from the base network) can produce a fixed set of detection predictions using a set of convolutional filters 1206. For a feature layer of size m×n with p channels, the basic element for predicting parameters of a potential detection is a 3×3× p small kernel that produces either a score for a category, or a shape offset relative to the default box coordinates. At each of the m×n locations where the kernel is applied, it produces an output value. The bounding box offset output values are measured relative to a default box position relative to each feature map location.

The present object detection network architecture includes the EdgeNeXt backbone 1102, in place of the base network 1202, combined with the auxiliary structure 1204, where the standard convolutions are replaced with separable convolutions. While standard convolution performs the channel-wise and spatial-wise computation in one step, depthwise separable convolution splits the computation into two steps: depthwise convolution applies a single convolutional filter per each input channel and pointwise convolution is used to create a linear combination of the output of the depthwise convolution.

Table 4 contains data for the results for object detection. EdgeNeXt consistently outperforms MobileNet backbones and gives competitive performance compared to MobileVit backbone. With ~38% fewer MAdds and comparable parameters, EdgeNeXt achieves 27.9 box AP which is 0.2 points more than MobileViT.

TABLE 4

Comparisons of EdgeNeXt with SOTA on COCO object detection.

| Model | Params↓ | MAdds↓ | mAP↑ |
|---|---|---|---|
| MobileNetV1 | 5.1M | 1.3 G | 22.2 |
| MobileNetV2 | 4.3M | 800M | 22.1 |
| MobileNetV3 | 5.0M | 620M | 22.0 |
| MobileViT-S | 5.7M | 2.4 G | 27.7 |
| EdgeNeXt-S | 6.2M | 2.1 G | 27.9 |

Semantic Segmentation

Figure 13:
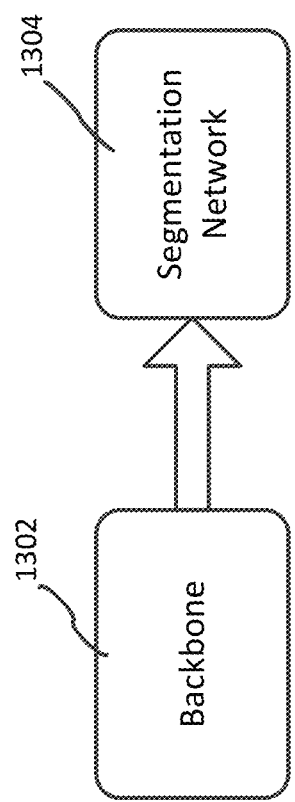
FIG. 13 is a block diagram for a network architecture for semantic segmentation according to an exemplary aspect of the disclosure.

FIG. 13 is a block diagram for a network architecture for semantic segmentation. In order to perform semantic segmentation, the EdgeNeXt is used as a backbone 1302 in DeepLabv3 1304 and the model is finetuned on the Pascal VOC dataset at an input resolution of 512×512. See Liang-Chieh Chen, George Papandreou, Florian Schroff, and Hartwig Adam. Rethinking atrous convolution for semantic image segmentation. arXiv preprint arXiv: 1706.05587, 2017; and Everingham et al., each incorporated herein by reference in their entirety. The EdgeNeXt backbone feature extractor 1302 is used to encode the network's input into a certain feature representation. The DeepLabv3 framework 1304 wraps functionalities around the feature extractor. By doing so, the feature extractor fits the semantic segmentation task in terms of accuracy and efficiency.

Figure 14:
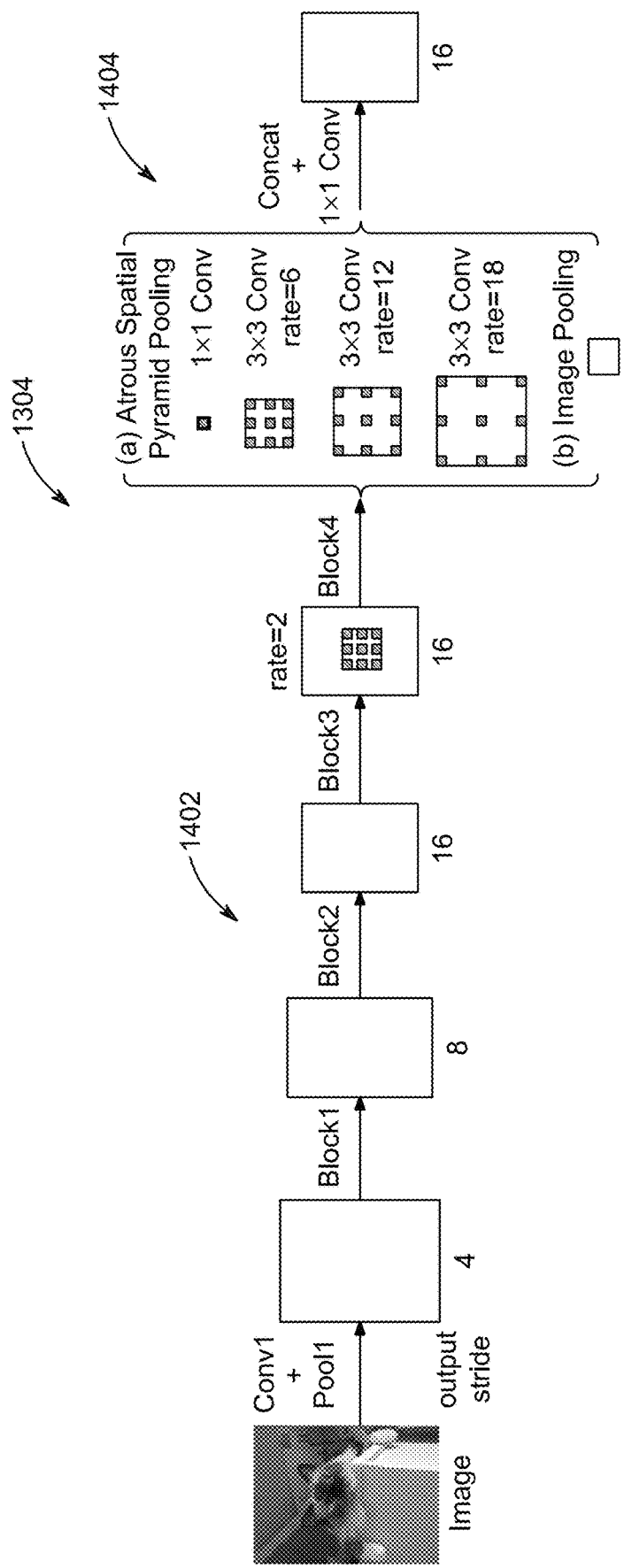
FIG. 14 is a block diagram of the network architecture of DeepLabv3.

FIG. 14 is a block diagram of the network architecture of DeepLabv3. DeepLabv3 1304 uses dilated convolution in a cascade design 1402 along with spatial pyramid pooling 1404 to encode multi-scale features which are useful in encoding objects at multiple scales. The model provides reasonable gain over previous approaches. The model obtains 80.2 mIOU on the validation dataset, providing a 1.1 points gain over MobileViT with ~36% fewer MAdds.

TABLE 5

Comparisons with SOTA on VOC semantic segmentation.

| Model | Params↓ | MAdds↓ | mIOU↑ |
|---|---|---|---|
| MobileNetV1 | 11.1M | 14.2 G | 75.3 |
| MobileNetV2 | 4.5M | 5.8 G | 75.7 |
| MobileViT-S | 5.7M | 13.7 G | 79.1 |
| EdgeNeXt-S | 6.5M | 8.7 G | 80.2 |

Ablations

Different design choices are used for ablations in the EdgeNext model.

SDTA encoder and adaptive kernel sizes. Table 6 shows the importance of SDTA encoders and adaptive kernel sizes in the present architecture. Replacing SDTA encoders with convolution encoders degrades the accuracy by 1.1%, indicating its usefulness in the design. When kernel size is fixed to 7 in all four stages of the network, it further reduces the accuracy by 0.4%. Overall, the present design provides an optimal speed-accuracy trade-off.

Also, with regard to Table 6, ablations are made to evaluate the contributions of SDTA components (e.g., adaptive branching and positional encoding). It can be seen that removing adaptive branching and positional encoding slightly decreases the accuracy.

Table 6 contains data of ablation on different components of EdgeNeXt and SDTA encoder design. The results show the benefits of SDTA encoders and adaptive kernels in the design. Further, it can be seen that adaptive branching and positional encoding (PE) in the SDTA module are required to get the good accuracy.

TABLE 6

Ablation on different components of EdgeNeXt and SDTA encoder design.

|  | Model | Top1 ↑ | Latency ↓ |
| --- | --- | --- | --- |
| Base | EdgeNeXt-S | 79.4 | 332 μs |
| Different Components | w/o SDTA Encoders + | 78.3 | 265 μs |
|  | w/o Adaptive Kernels | 77.9 | 301 μs |
| SDTA Components | w/o Adaptive | 79.3 | 332 μs |
|  | Branching + w/o PE | 79.2 | 301 μs |

Table 7 contains ablation data for the different hybrid design choices for the EdgeNext model. Table 7 contains data of ablation on the hybrid architecture of Convolution and SDTA encoders. After studying MetaFormer, all convolutional modules in the last two stages are replaced with SDTA encoders. See Weihao Yu, Mi Luo, Pan Zhou, Chenyang Si, Yichen Zhou, XinchaoWang, Jiashi Feng, and Shuicheng Yan. Metaformer is actually what you need for vision. In *Proceedings of the IEEE/CVF Conference on Computer Vision and Pattern Recognition,* 2021, incorporated herein by reference in its entirety. The results show superior performance when all blocks in the last two stages are SDTA blocks However it can be seen that the latency (row-2 vs 3) is increased. It can be seen that the hybrid design where an SDTA module is used as the last block in the last three stages provides an optimal speed-accuracy trade-off.

TABLE 7

Ablation on the hybrid architecture of Conv. and SDTA encoders.

| Model Configuration | Top1 ↑ | Latency ↓ |
| --- | --- | --- |
| 1: Conv = [3, 3, 9, 0], SDTA = [0, 0, 0, 3] | 79.3 | 303 μs |
| 2: Conv = [3, 3, 0, 0], SDTA = [0, 0, 9, 3] | 79.7 | 393 μs |
| 3: Conv = [3, 2, 8, 2], SDTA = [0, 1, 1, 1] | 79.4 | 332 μs |

Table 8 provides an ablation of the importance of using SDTA encoders at different stages of the network. It can be seen that progressively adding an SDTA encoder as the last block of the last three stages improves the accuracy with some loss in inference latency. However, as seen in row 4, the best trade-off between accuracy and speed is where the SDTA encoder is added as the last block in the last three stages of the network. Further, it can be seen that adding a global SDTA encoder to the first stage of the network is not helpful where the features are not mature.

TABLE 8

Ablation on using SDTA encoder at different stages of the network.

| Model Configuration | Top1 ↑ | Latency ↓ |
| --- | --- | --- |
| 1: Conv = [3, 3, 9, 3], SDTA = [0, 0, 0, 0] | 78.3 | 265 μs |
| 2: Conv = [3, 3, 9, 2], SDTA = [0, 0, 0, 1] | 78.6 | 290 μs |
| 3: Conv = [3, 3, 8, 2], SDTA = [0, 1, 1, 1] | 79.1 | 310 μs |
| 4: Conv = [3, 2, 8, 2], SDTA = [0, 1, 1, 1] | 79.4 | 332 μs |
| 5: Conv = [2, 2, 8, 2], SDTA = [1, 1, 1, 1] | 79.2 | 387 μs |

Also an ablation on using the SDTA module at the start of each stage versus at the end of each stage is provided. Table 9 contains data of ablation on using SDTA at the start and end of each stage in EdgeNeXt. The results show that it is generally beneficial to use SDTA at the end of each stage. This observation is consistent with the recent work. See Yanghao Li, Chao-Yuan Wu, Haoqi Fan, Karttikeya Mangalam, Bo Xiong, Jitendra Malik, and Christoph Feichtenhofer. Improved multiscale vision transformers for classification and detection. In *Proceedings of the IEEE/CVF Conference on Computer Vision and Pattern Recognition,* 2022, incorporated herein by reference in its entirety.

TABLE 9

Ablation on using SDTA at the start and end of each stage in EdgeNeXt.

| SDTA Configuration | Top1 ↑ | Latency ↓ |
| --- | --- | --- |
| Start of Stage (SDTA = [0, 1, 1, 1]) | 79.0 | 332 μs |
| End of Stage (SDTA = [0, 1, 1, 1]) | 79.4 | 332 μs |

Figure 15:
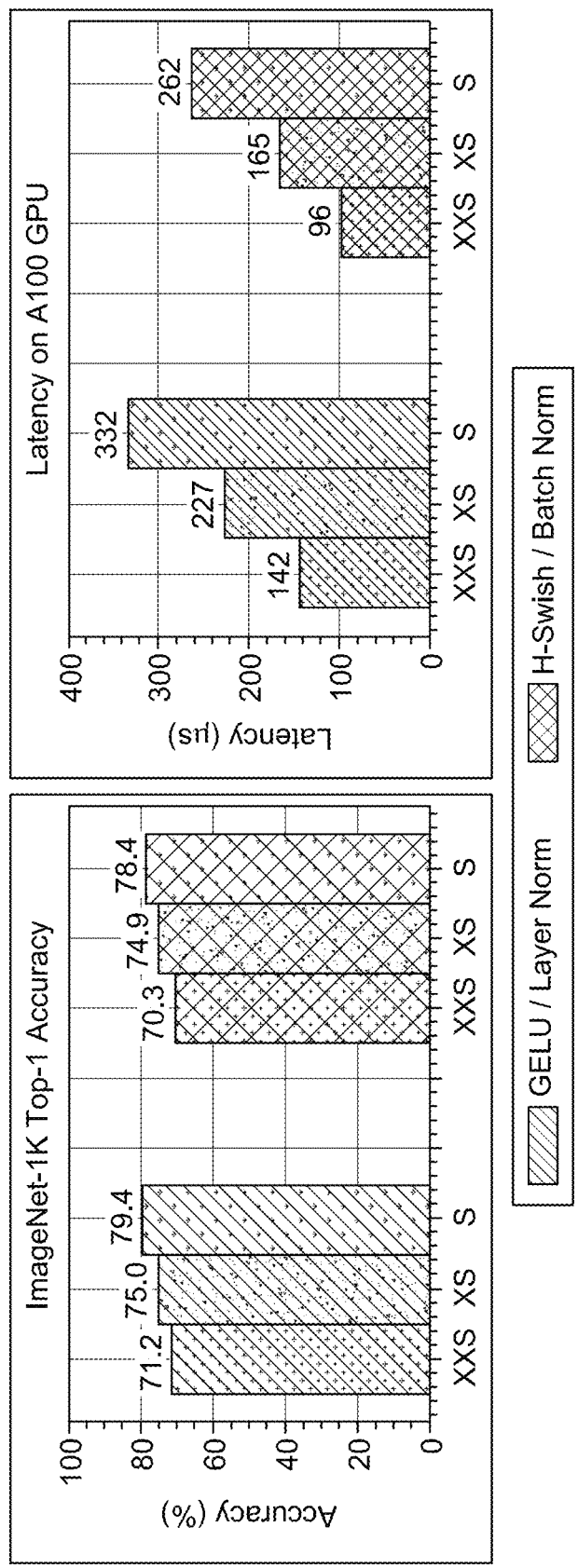
FIG. 15 is a chart of ablation on the effect of using different activation functions and normalization layers on accuracy and latency.
Figure 16A:
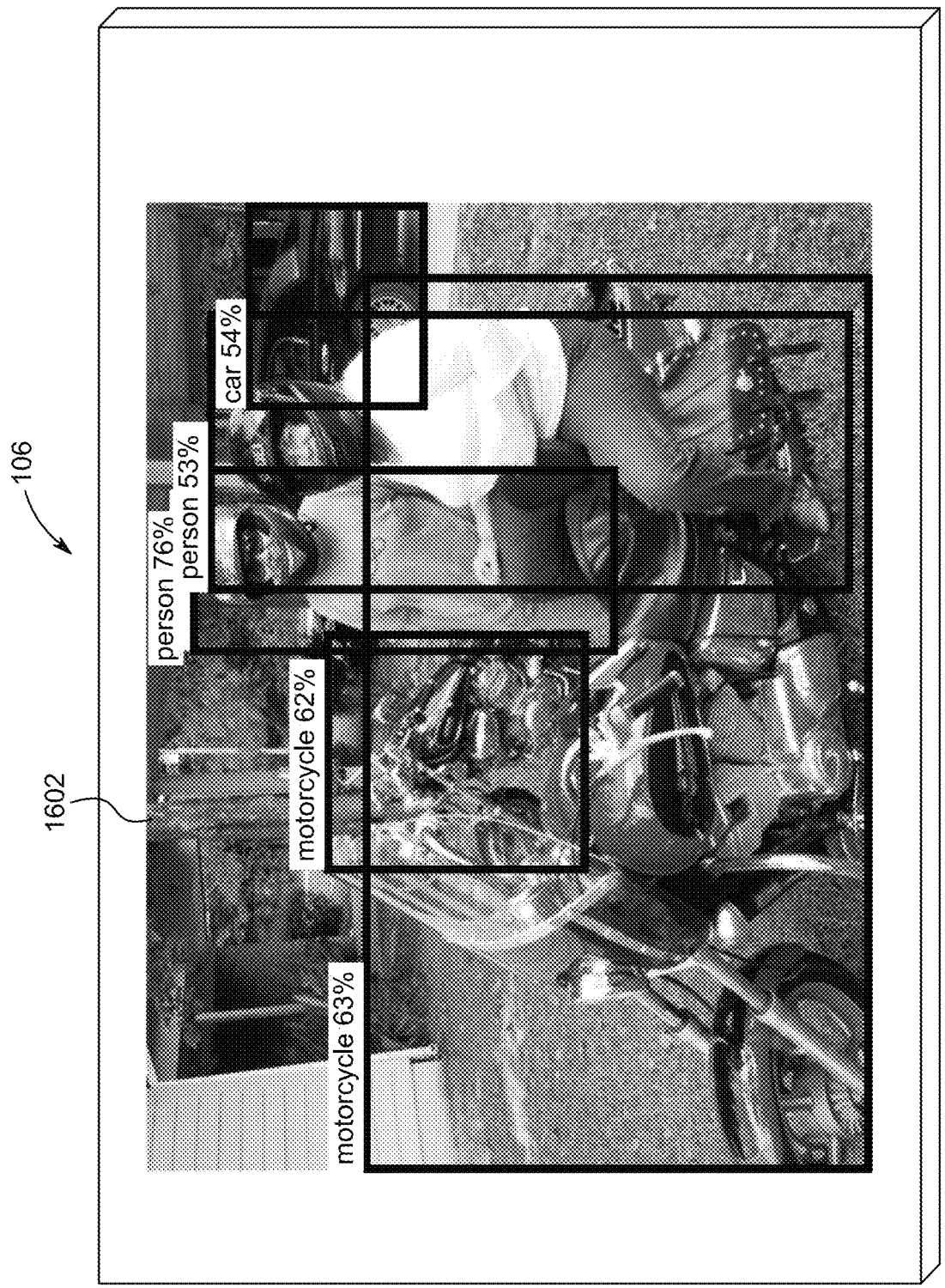
FIGS. 16A-16F are display screens for results of the EdgeNeXt detection model on COCO validation dataset.
Figure 16B:
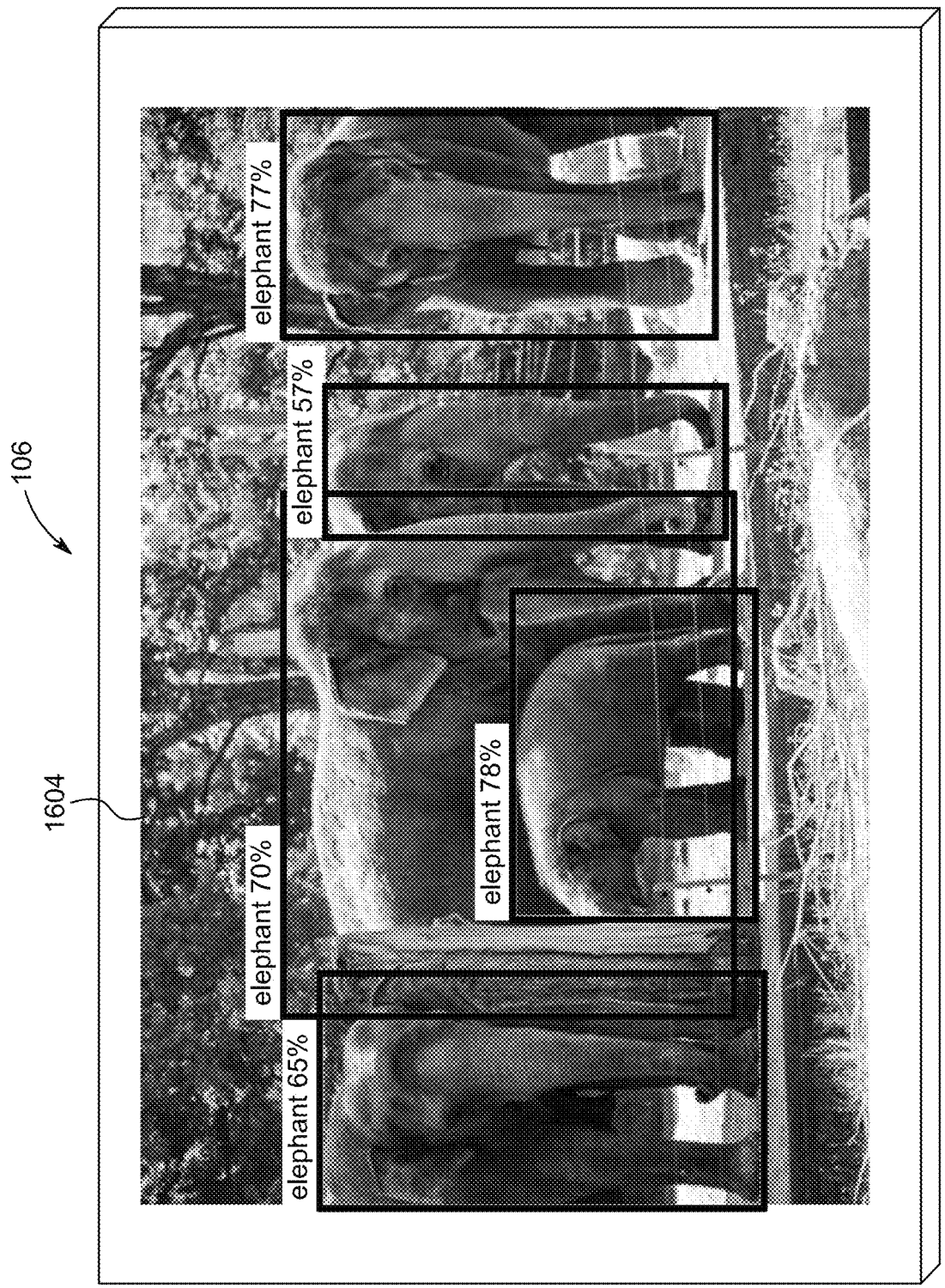
Figure 16C:
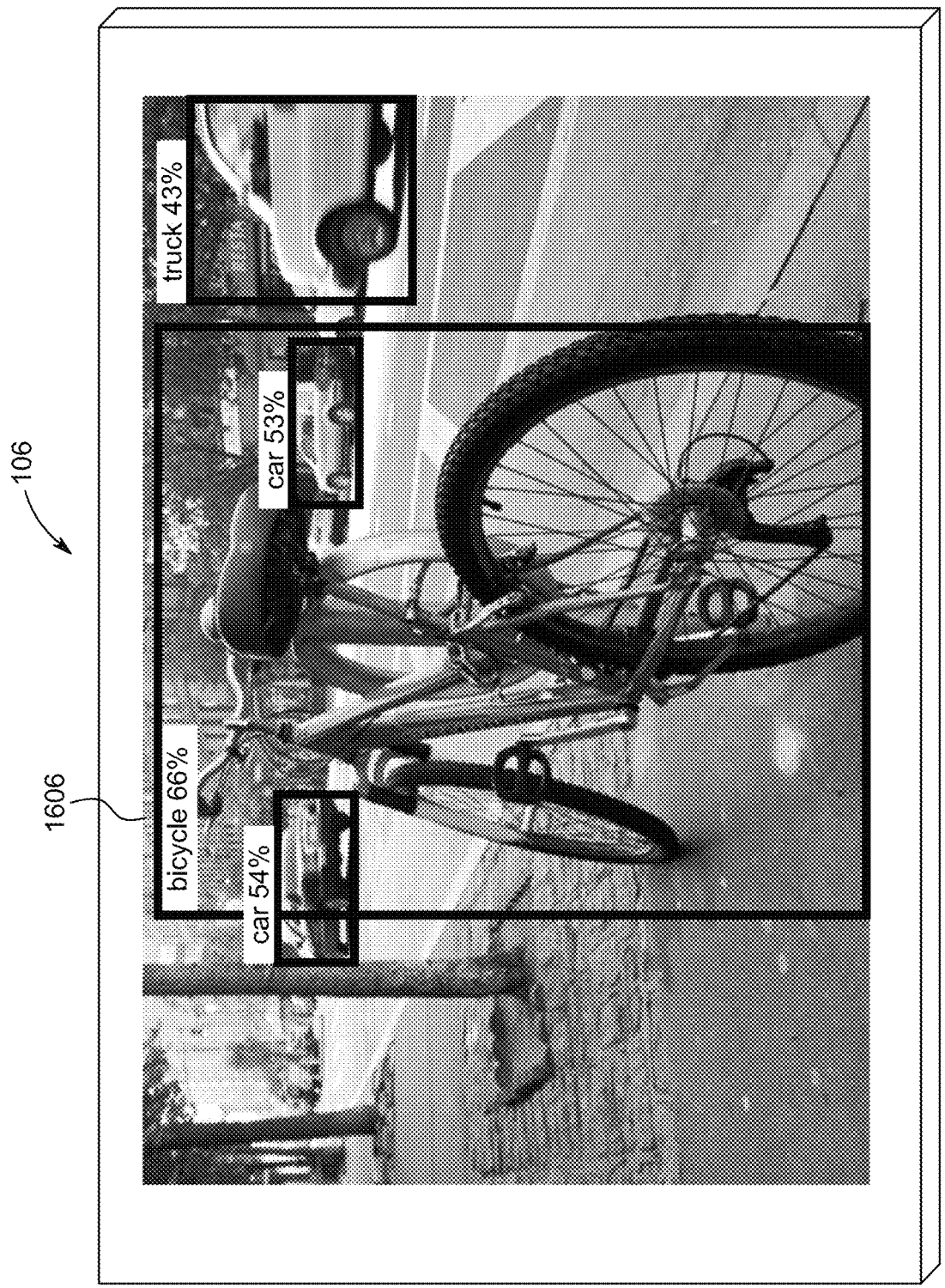
Figure 16D:
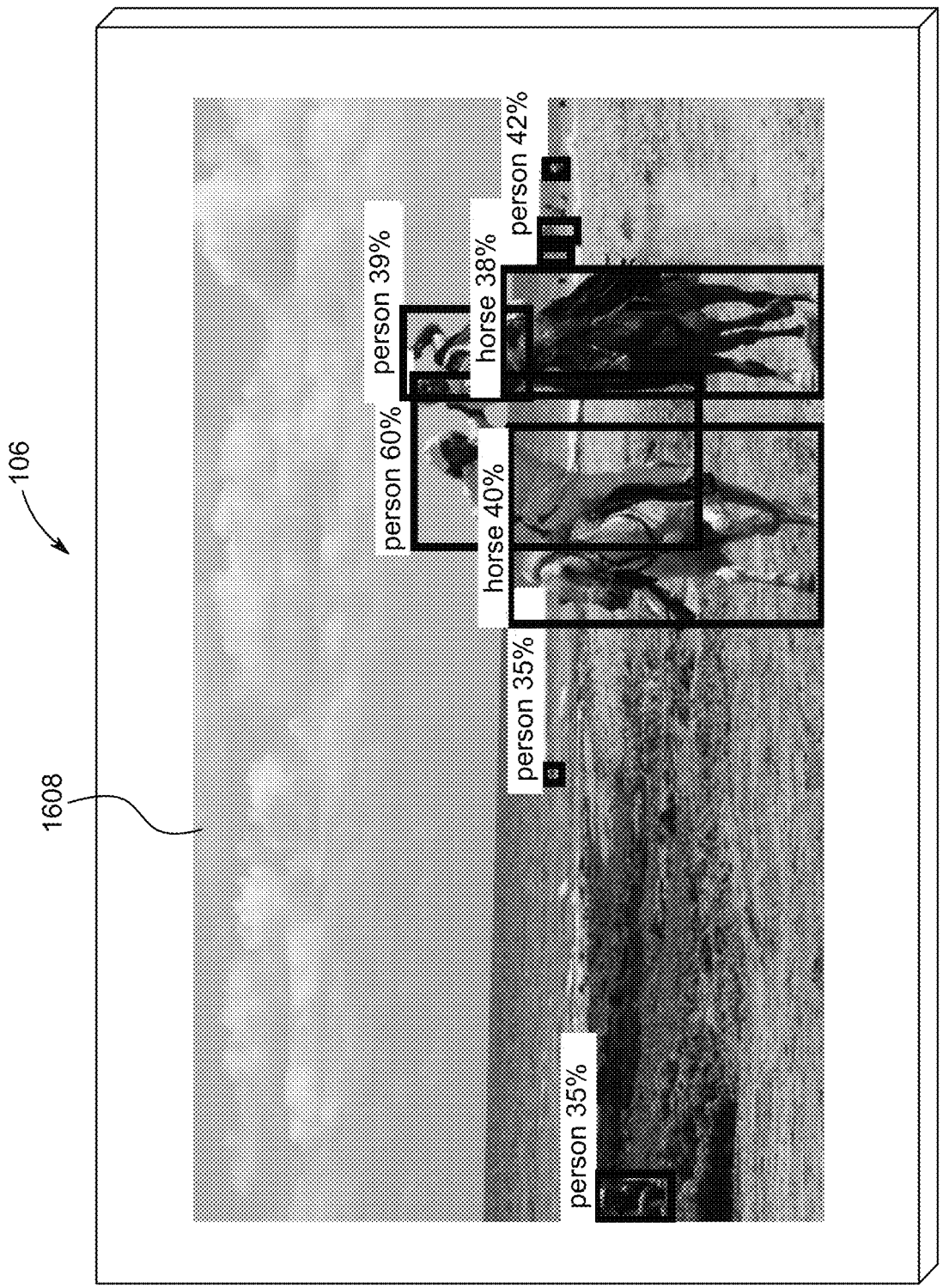
Figure 16E:
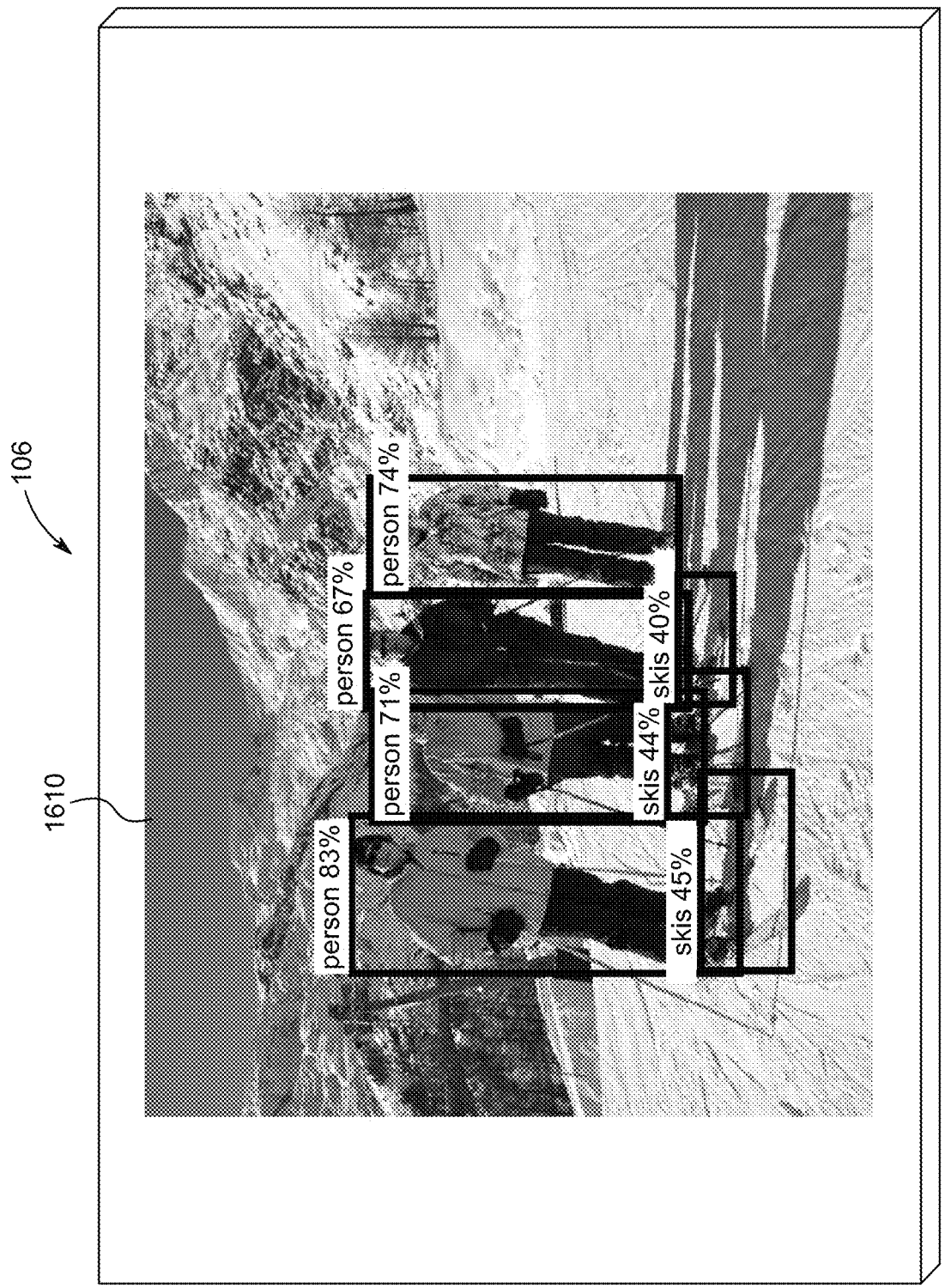
Figure 16F:
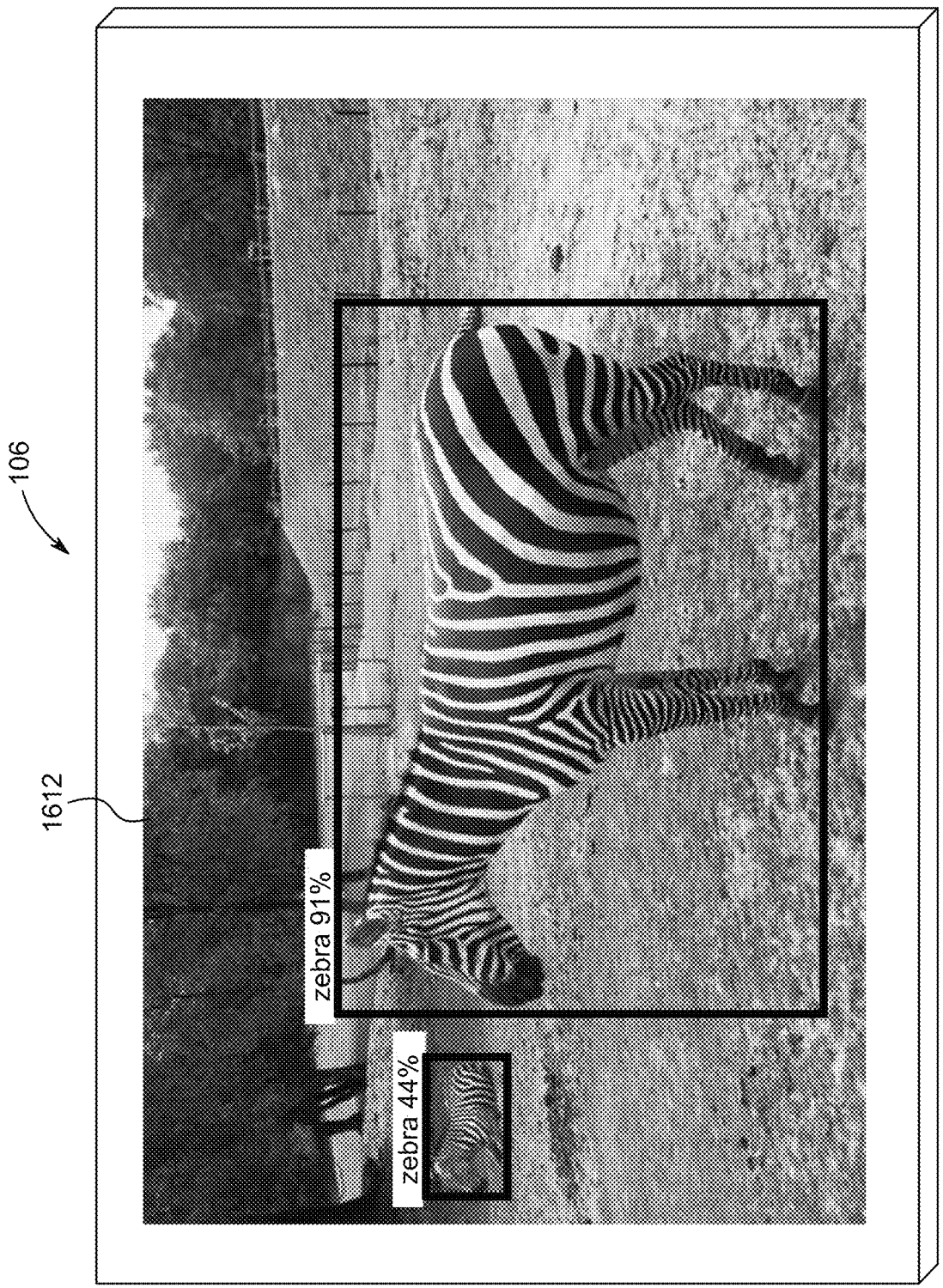
Figure 17A:
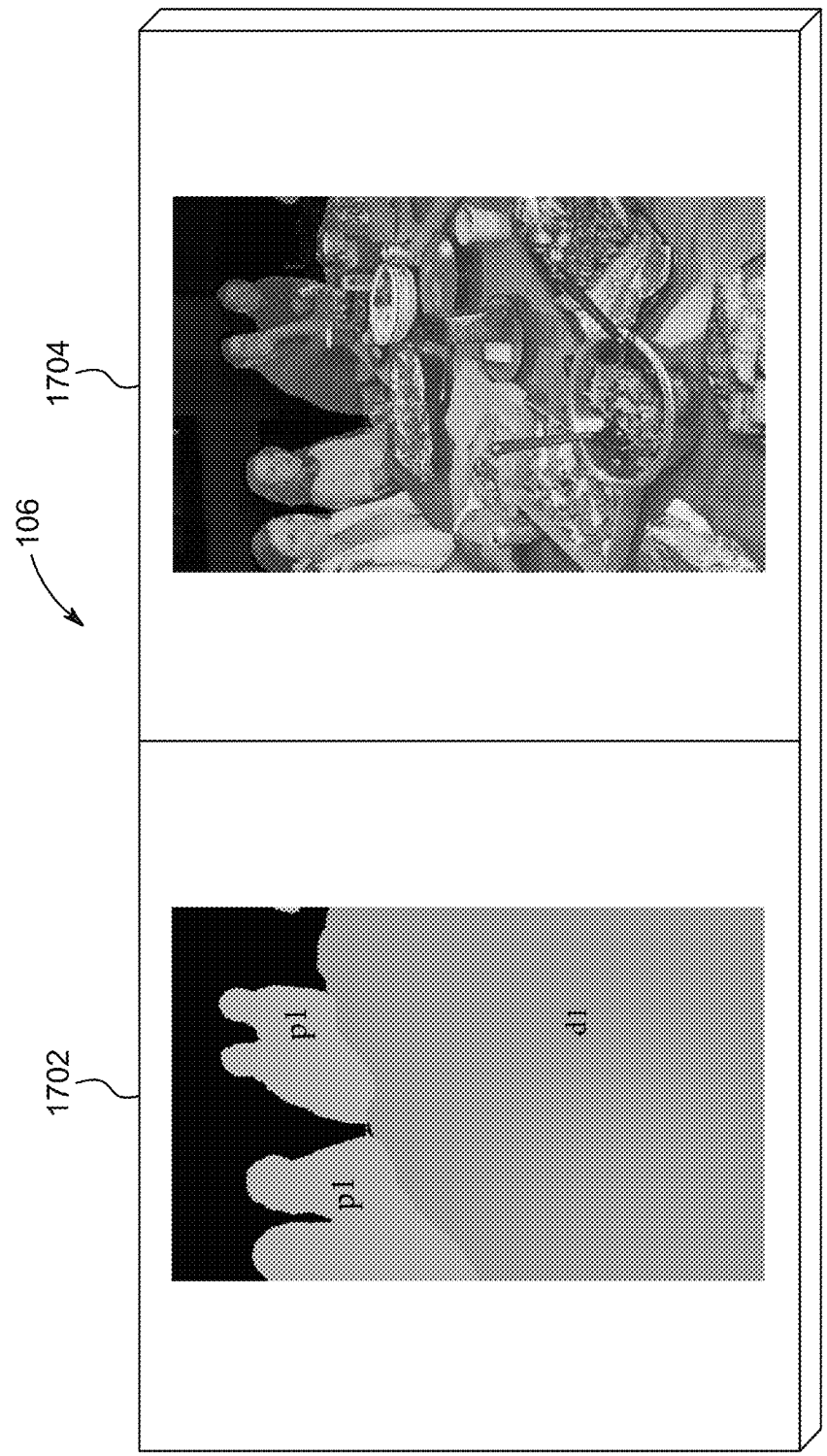
FIGS. 17A-17G are display screens for results of EdgeNeXt-S segmentation model on unseen COCO validation dataset.
Figure 17B:
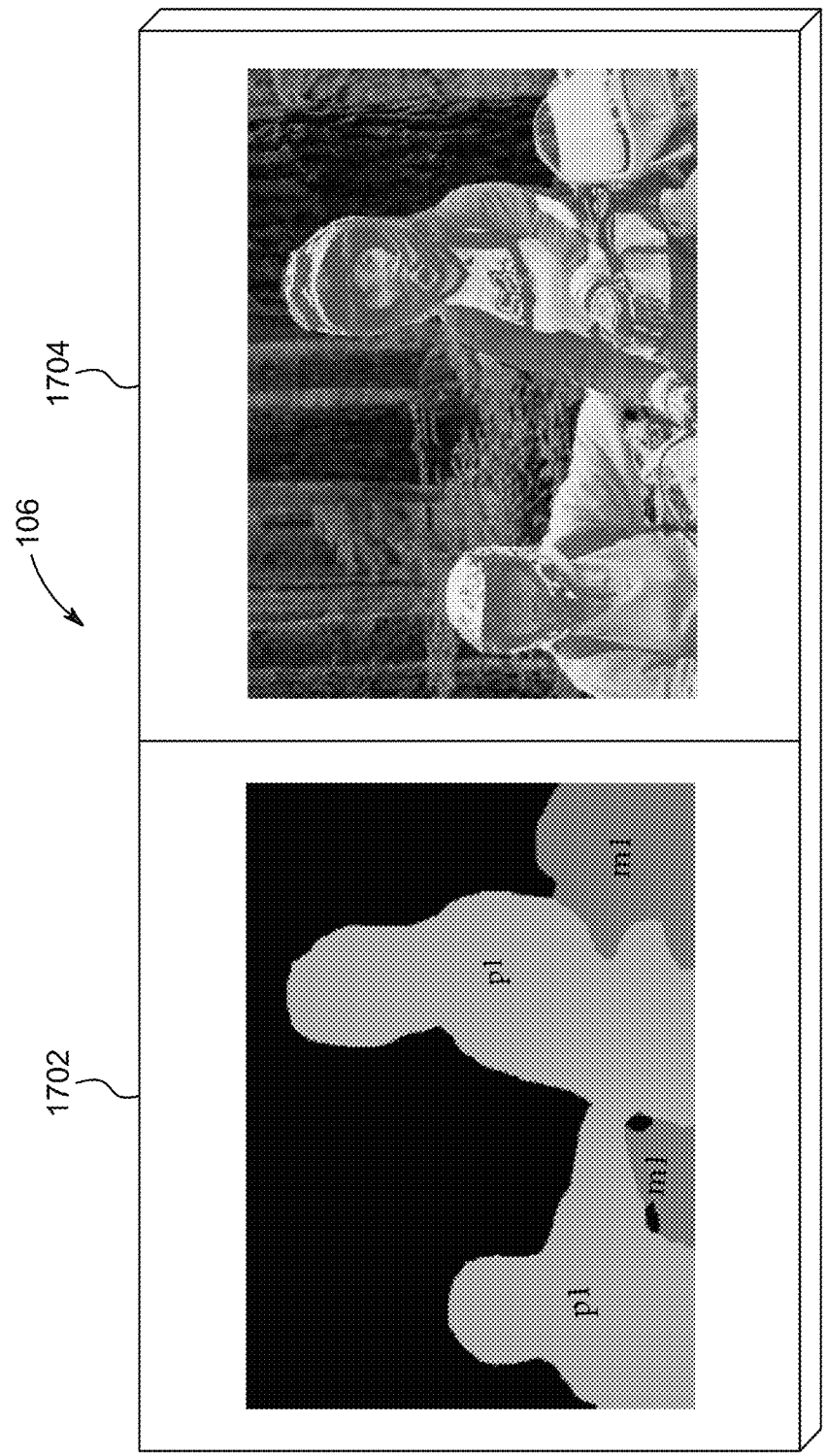
Figure 17C:
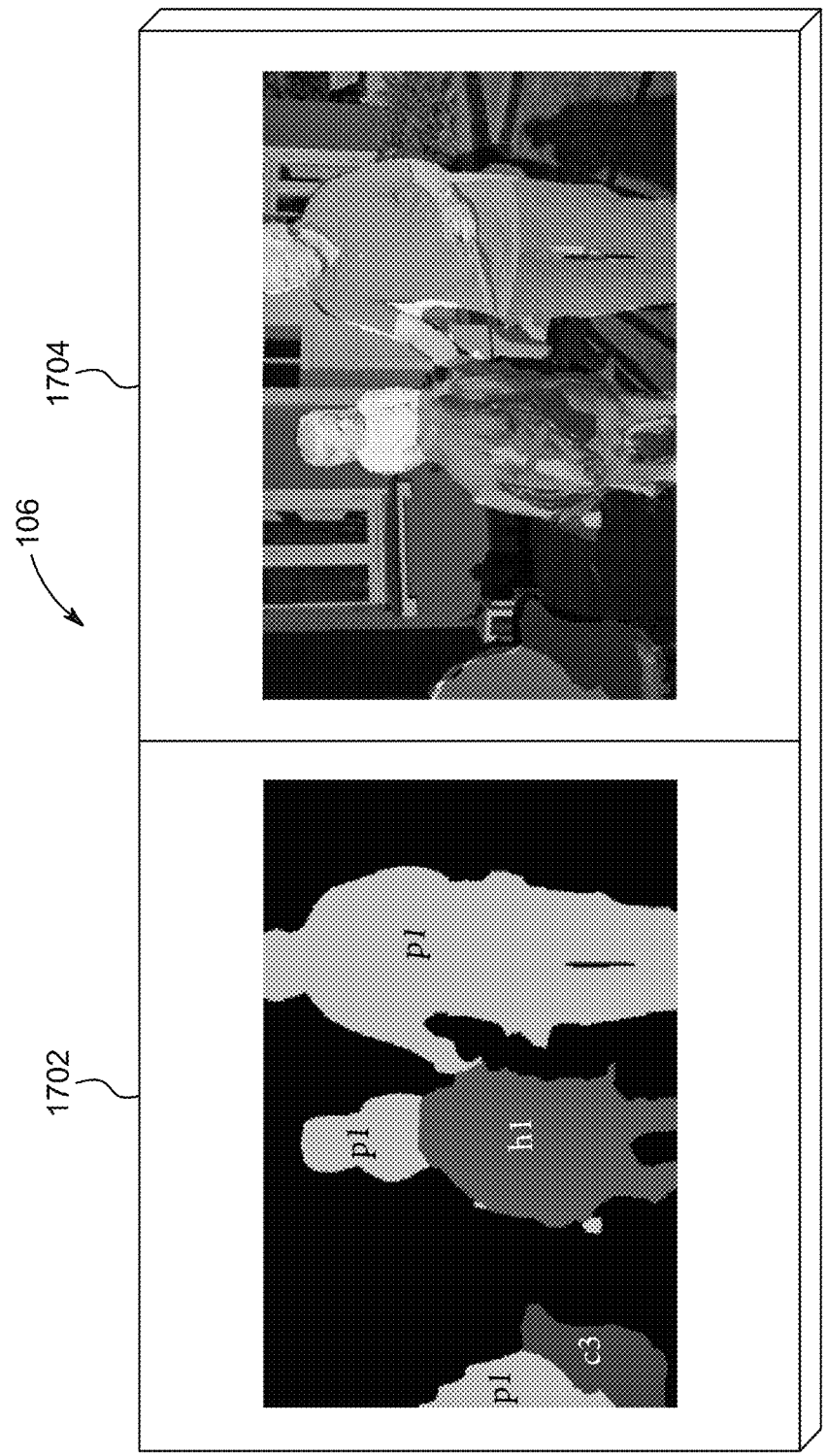
Figure 17D:
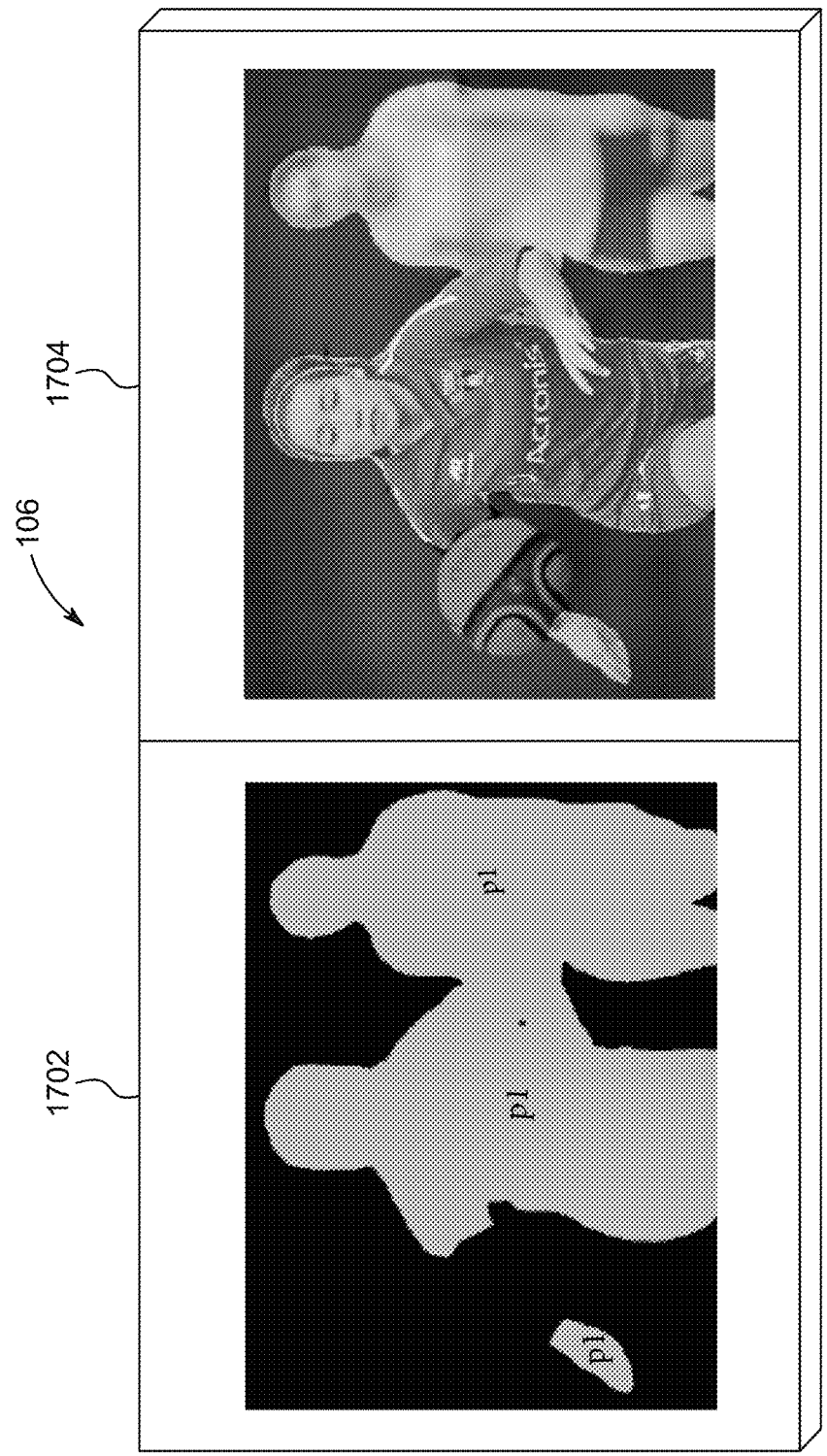
Figure 17E:
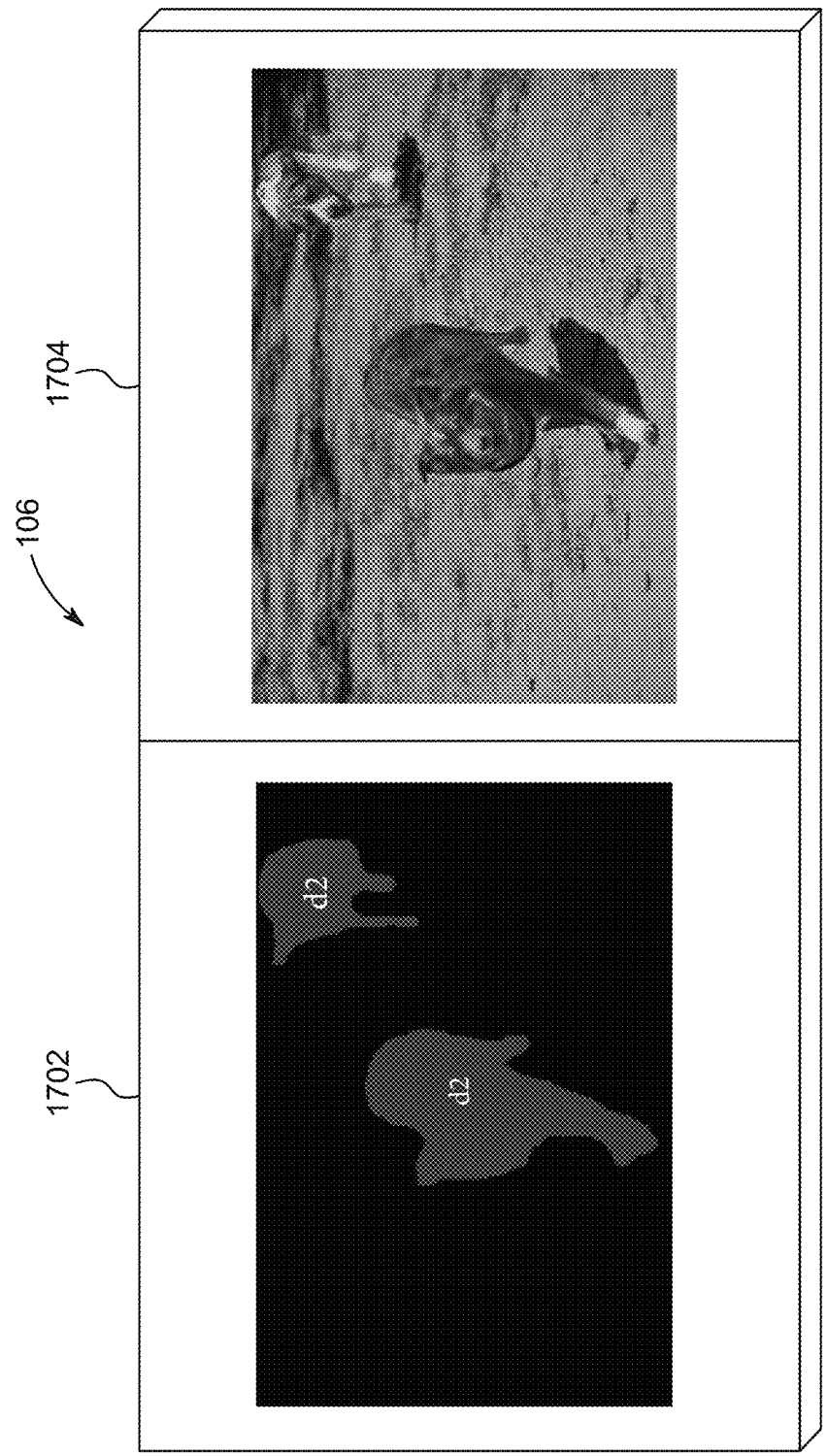
Figure 17F:
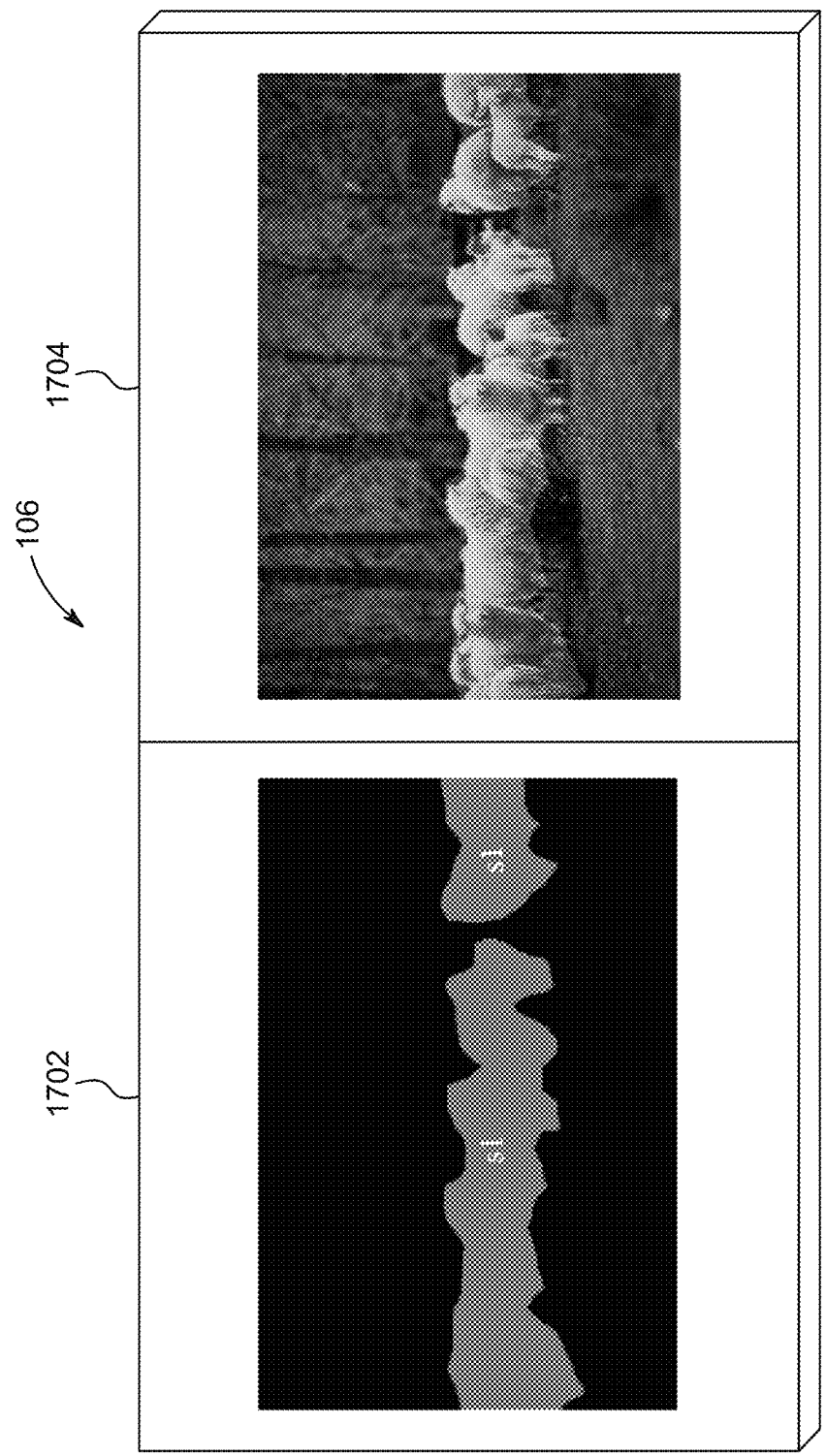
Figure 17G:
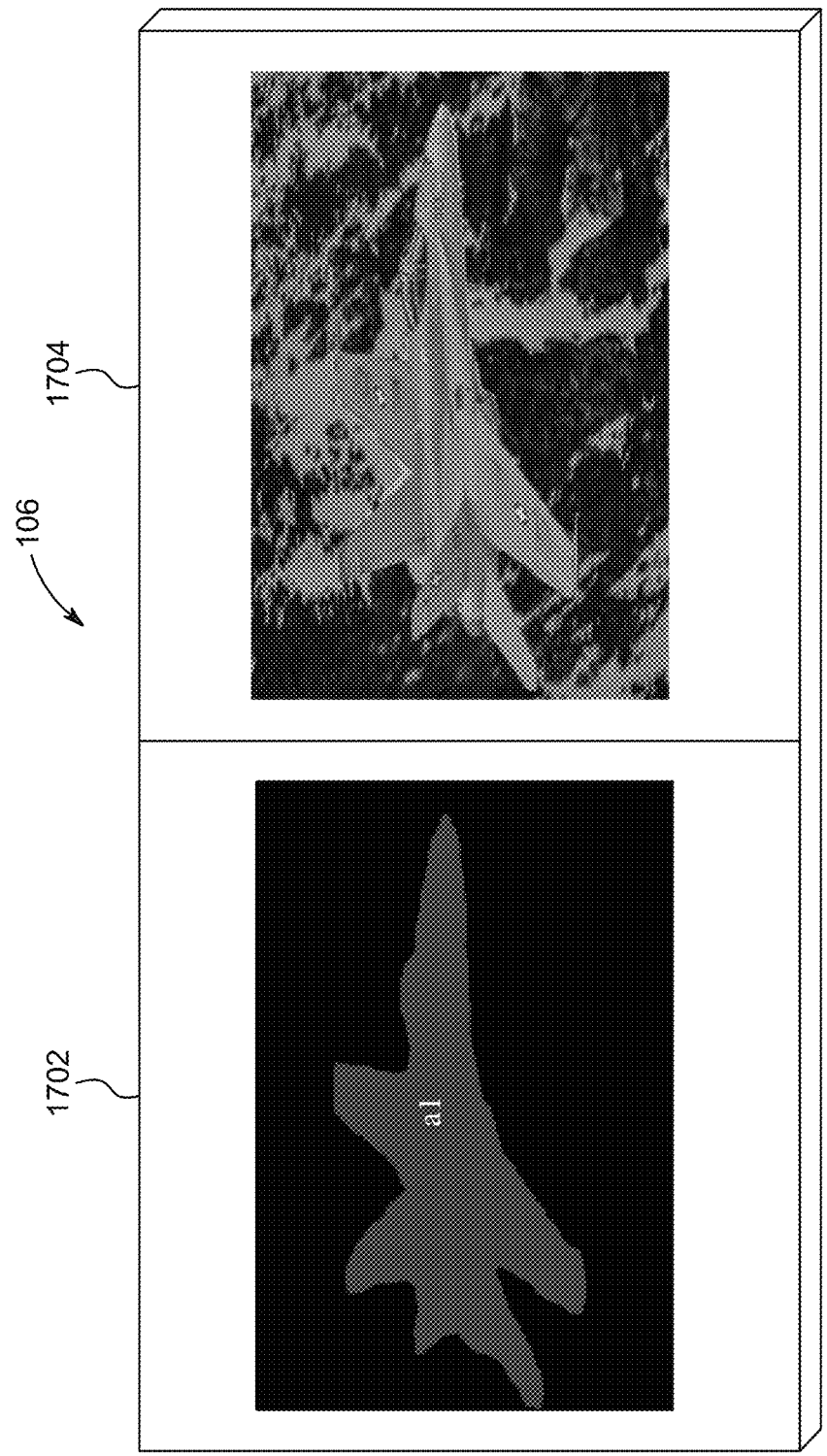

Ablation is performed to determine the effect of activation and normalization. EdgeNeXt uses GELU activation and layer normalization throughout the network. FIG. 15 is a chart of ablation on the effect of using different activation functions and normalization layers on accuracy and latency. It was found that the current PyTorch implementations of GELU and layer normalization may not be optimal for high-speed inference. For purposes of ablation study, the GELU is replaced with Hard-Swish and layer-norm is replaced with batch-norm and the three models, S, XS, XXS, can be retrained based on the different activation functions and normalization layers.

The Gaussian Error Linear Unit (GELU) activation function is $x\Phi(x)$, where $\Phi(x)$ the standard Gaussian cumulative distribution function. The GELU nonlinearity weights inputs by their value, rather than gates inputs by their sign as in ReLUs.

Hard Swish is a type of activation function based on Swish, but replaces the computationally expensive sigmoid with a piecewise linear analogue. Swish is an activation function, $f(x)=x \cdot sigmoid(\beta x)$, where $\beta$ a learnable parameter.

Batch Norm is a network layer that gets inserted between a hidden layer and the next hidden layer. Its job is to take the outputs from the first hidden layer and normalize them before passing them on as the input of the next hidden layer.

The chart in FIG. 15 indicates that the Hard Swish activation and batch normalization significantly improves the latency, but at the cost of some loss in accuracy. Still, the latency is reduced by a large margin.

In one embodiment, results of object detection and semantic segmentation can be displayed on a display screen. FIGS. 16A-16F and 17A-17G are example display screens using the display device of a client computer 106. The displays can also be performed using a display device of a workstation, such as 118 in FIG. 3. FIGS. 16A-16F and 17A-17G show results of EdgeNeXt-S detection and segmentation models respectively. The model can precisely detect and segments objects in various views.

In particular, FIGS. 16A-16F are display screens for results of the EdgeNeXt detection model on COCO validation dataset. The model is trained on COCO dataset with 80 detection classes. Each figure is a display for a single image 1602, 1604, 1606, 1608, 1610, 1612. Alternative displays can include two or more images, or multiple thumbnail images that link to full images. In the case of object detection, each image is displayed with bounding boxes for detected objects. Although the bounding boxes are shown as black lines in the drawings for the sake of clarity, it should be understood that the bounding boxes would be shown as colors that correspond to the object type. In the images of FIGS. 16A-16F, the bounding boxes follow the color conventions for the COCO dataset classes. As shown in the figures, the model can effectively localize and classify objects in diverse scenes.

FIGS. 17A-17G are display screens for results of EdgeNeXt-S segmentation model on unseen COCO validation dataset. The model is trained on VOC dataset with 20 segmentation classes. The segmentation classes are as follows:

| | |
|---|---|
| Airplane | a1 |
| Bicycle | b1 |
| Bird | b2 |
| Boat | b3 |
| Bottle | b4 |
| Bus | b5 |
| Car | c1 |
| Cat | c2 |
| Chair | c3 |
| Cow | c4 |
| Dining-Table | d1 |
| Dog | d2 |
| Horse | h1 |
| Motorbike | m1 |
| Person | p1 |
| Potted-Plant | p2 |
| Sheep | s1 |
| Sofa | s2 |
| Train | t1 |
| TV/Monitor | t2 |

The left half 1702 of each display screen shows the predicted semantic segmentation mask where 'black' color represents the background pixels. The segmentation masks are shown with a class label for purposes of explanation. The actual segmentation mask can be color coded. The right half 1704 of each display screen displays the predicted masks on top of original images. It should be understood that each half of the display screen can be displayed on their own individual display screen. As shown in the figures, the model provides high-quality segmentation masks on unseen COCO images.

Numerous modifications and variations of the present invention are possible in light of the above teachings. It is therefore to be understood that within the scope of the appended claims, the invention may be practiced otherwise than as specifically described herein.

EdgeNeXt is a hybrid design consisting of convolution and efficient self-attention based encoders to jointly model local and global information effectively, while being efficient in terms of both parameters and MAdds on vision tasks with superior performance compared to state-of-the-art methods. It should be understood that modifications and variations of EdgeNeXt are effective in their ability to generalize to unseen datasets.

The invention claimed is:

1. An edge computing system for object detection, comprising:
processing circuitry including:
at least one multi-code graphics processing unit (GPU) having GPU memory, and
a multi-core central processing unit (CPU) connected to random access memory (RAM); and
at least one camera;
wherein the processing circuitry is configured with a hybrid convolutional neural network (CNN) and vision transformer backbone network in an object detection neural network, the backbone network comprising:
an input for inputting an image from the at least one camera;
a first stage having
a first convolutional encoder to extract local features from feature maps of the input image;
a second stage having
a plurality of consecutive second convolutional encoders,
a positional encoding layer,
a second-stage split depth-wise transpose attention (SDTA) encoder;
a third stage and a fourth stage, each having
a plurality of consecutive third convolutional encoders,
a third stage and a fourth stage split depth-wise transpose attention (SDTA) encoder,
in which each of the second stage, third stage, fourth stage SDTA encoders perform multi-headed self-attention by applying a dot product operation across channel dimensions in order to compute cross-covariance across channels to generate attention feature maps, wherein the object detection neural network comprises:
a feed-forward convolutional network that produces a fixed-size collection of bounding boxes and scores for a presence of object class instances in those boxes, followed by a non-maximum suppression layer to produce final object detections.

2. The edge computing system of claim 1, configured in a self-guided mobile robot having an embedded control module for controlling motion of the mobile robot based on objects detected with the processing circuitry.

3. The edge computing system of claim 1, wherein the first, second, and third convolutional encoders have a depth-wise convolution layer with adaptive kernel sizes that vary depending on the stage number.

4. The edge computing system of claim 3, wherein the first, second, and third convolution encoders further include a plurality of point-wise convolution layers.

5. The edge computing system of claim 1, wherein each SDTA encoder has
a first component that encodes various spatial levels within the input image, and
a second component that encodes global image representations.

6. The edge computing system of claim 5, wherein the first component is a lightweight network with a constrained number of parameters and multiply-additions.

7. The edge computing system of claim 1, wherein the processing circuitry splits the generated attention feature maps of a preceding convolutional encoder into a plurality of subsets.

8. The edge computing system of claim 7, wherein a number of the subsets is based on the stage number.

9. The edge computing system of claim 5, wherein the processing circuitry performs a transposed attention operation including
- calculating a transposed query and key attention across the channel dimensions, and
- calculating a cross-covariance across the channels to generate the attention feature maps.

10. The edge computing system of claim 1, wherein the feed-forward convolutional network includes a plurality of separable convolution operations.

11. A non-transitory computer readable storage medium storing computer program instructions, which when executed in an edge computing system, performs a method of object detection, wherein the edge computing system comprises processing circuitry including:
- at least one multi-code graphics processing unit (GPU) having GPU memory, and
- a multi-core central processing unit (CPU) connected to random access memory (RAM),
- wherein the processing circuitry is configured with a hybrid convolutional neural network (CNN) and vision transformer backbone network in an object detection neural network, the method comprising:
- inputting an image:
- in a first stage having a convolutional encoder, extracting local features from the input image:
- in following stages each having a split depth-wise transpose attention (SDTA) encoder, performing multi-headed self-attention by applying a dot product operation across channel dimensions in order to compute cross-covariance across channels to generate attention feature maps; and
- producing, in the object detection neural network, a fixed-size collection of bounding boxes and scores for a presence of object class instances in those boxes, followed by
- producing, by a non-maximum suppression layer, final object detections.

12. The computer readable storage medium of claim 11, further comprising:
- controlling, via an embedded control module of a self-guided mobile robot, motion of the mobile robot based on the detected objects.

13. The computer readable storage medium of claim 11, wherein the following stages comprise a plurality of convolutional encoders each having a depth-wise convolution layer, the method further comprising adapting kernel sizes depending on the stage number.

14. The computer readable storage medium of claim 13, wherein the plurality of convolution encoders further includes a plurality of point-wise convolution layers, the method further comprising enhancing the local features and performing non-linear feature mapping of the local features.

15. The computer readable storage medium of claim 11, the method further comprising
- encoding various spatial levels within the input image; and
- encoding global image representations.

16. The computer readable storage medium of claim 13, the method further comprising:
- splitting the generated attention feature maps of a preceding convolutional encoder into a plurality of subsets.

17. The computer readable storage medium of claim 16, wherein a number of the subsets is based on the stage number.

18. The computer readable storage medium of claim 11, the method further comprising:
- calculating a transposed query and key attention across the channel dimensions; and
- calculating a cross-covariance across the channels to generate the attention feature maps.

19. The computer readable storage medium of claim 11, wherein the producing the fixed-size collection of bounding boxes further comprises performing, in a head of the object detection neural network, a plurality of separable convolutions.

20. A method of object detection, with an edge computing system that comprises processing circuitry including:
- at least one multi-code graphics processing unit (GPU) having GPU memory, and
- a multi-core central processing unit (CPU) connected to random access memory (RAM),
- wherein the processing circuitry is configured with a hybrid convolutional neural network (CNN) and vision transformer backbone network in an object detection neural network, the method comprising:
- inputting an image;
- in a first stage of the backbone network having a convolutional encoder, extracting local features from the input image;
- in following stages of the backbone network, each following stage having a split depth-wise transpose attention (SDTA) encoder, performing multi-headed self-attention by applying a dot product operation across channel dimensions in order to compute cross-covariance across channels to generate attention feature maps; and
- producing, in the object detection neural network, a fixed-size collection of bounding boxes and scores for a presence of object class instances in those boxes, followed by
- producing, by a non-maximum suppression layer, final object detections.

* * * * *